(12) United States Patent
Kanao et al.

(10) Patent No.: US 11,256,779 B2
(45) Date of Patent: Feb. 22, 2022

(54) CALCULATION APPARATUS, CALCULATION METHOD AND COMPUTER PROGRAM PRODUCT

(71) Applicant: KABUSHIKI KAISHA TOSHIBA, Tokyo (JP)

(72) Inventors: Taro Kanao, Kawasaki Kanagawa (JP); Kosuke Tatsumura, Yokohama Kanagawa (JP); Hayato Goto, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 72 days.

(21) Appl. No.: 16/801,429

(22) Filed: Feb. 26, 2020

(65) Prior Publication Data
US 2021/0073319 A1 Mar. 11, 2021

(30) Foreign Application Priority Data
Sep. 9, 2019 (JP) .............................. JP2019-163893

(51) Int. Cl.
*G06F 17/16* (2006.01)
(52) U.S. Cl.
CPC .................................... *G06F 17/16* (2013.01)
(58) Field of Classification Search
CPC ................................. G06F 17/16; G06F 17/11
(Continued)

(56) References Cited

U.S. PATENT DOCUMENTS

| 2012/0221678 A1* | 8/2012 | Tanaka ................. H04L 1/1835 709/217 |
| 2016/0065210 A1 | 3/2016 | Yoshimura et al. |

(Continued)

FOREIGN PATENT DOCUMENTS

| JP | 4329933 B2 | 9/2009 |
| JP | 5168048 B2 | 3/2013 |

(Continued)

OTHER PUBLICATIONS

Goto et al., "Combinatorial optimization by simulating adiabatic bifurcations in nonlinear Hamiltonian systems," Sci. Adv., vol. 5, No. 4, eaav2372, pp. 1-8 (Apr. 19, 2019).

(Continued)

*Primary Examiner* — Tan V Mai
(74) *Attorney, Agent, or Firm* — Finnegan, Henderson, Farabow, Garrett & Dunner, L.L.P.

(57) ABSTRACT

A calculation apparatus according to an embodiment includes one or more processing circuits configured to function as an interaction unit, a first addition unit, and a time evolution unit. The interaction unit generates N first intermediate variables obtained by performing a matrix computing on the N first variables and the coefficient matrix at the first time. The first addition unit calculates N second variables at the second time at which the sampling period elapses from the first time. The time evolution unit executes a time evolution process on the N second variables at the first time to generate N first variables at the second time. If the N first variables at the second time unsatisfied a predetermined constraint condition, the time evolution unit changes the N second variables at the second time in a direction of satisfying the constraint condition.

13 Claims, 13 Drawing Sheets

(58) Field of Classification Search
USPC .................................................. 708/607
See application file for complete search history.

(56) References Cited

U.S. PATENT DOCUMENTS

| | | | |
|---|---|---|---|
| 2018/0005114 | A1 | 1/2018 | Tomita et al. |
| 2018/0018563 | A1 | 1/2018 | Tsukamoto et al. |
| 2019/0266212 | A1 | 8/2019 | Goto et al. |
| 2020/0089731 | A1* | 3/2020 | Tatsumura ............ G06F 7/5443 |
| 2020/0166900 | A1* | 5/2020 | Koyama ............... G05B 19/042 |
| 2020/0393798 | A1* | 12/2020 | Kushibe ................. G06N 7/08 |

FOREIGN PATENT DOCUMENTS

| | | |
|---|---|---|
| JP | 5865456 B1 | 2/2016 |
| JP | 2018-5541 A | 1/2018 |
| JP | 2018-10474 A | 1/2018 |
| JP | 2019-145010 A | 8/2019 |

OTHER PUBLICATIONS

O'Donoghue et al., "Hamiltonian descent for composite objectives," 33$^{rd}$ Conference on Neural Information Processing Systems (NeurIPS 2019), arXiv:1906.02608v2, pp. 1-16 (Nov. 17, 2019).

Maddison et al., "Hamiltonian Descent Methods," arXiv:1809.05042v1, pp. 1-72 (Sep. 13, 2018).

Inagaki et al., "A coherent Ising machine for 2000-node optimization problems," Science, vol. 354, Issue 6312, pp. 603-606, and Supplementary Materials, pp. 1-12 (Oct. 20, 2016).

Goto, "Bifurcation-based adiabatic quantum computation with a nonlinear oscillator network," Sci. Rep. 6:21686, 8 pages (Feb. 22, 2016).

Haribara et al., "Performance evaluation of coherent Ising machines against classical neural networks," Quantum Science and Technology 2:044002, pp. 1-8 (Aug. 14, 2017).

* cited by examiner

CALCULATION APPARATUS, CALCULATION METHOD AND COMPUTER PROGRAM PRODUCT

CROSS-REFERENCE TO RELATED APPLICATIONS

This application is based upon and claims the benefit of priority from Japanese Patent Application No. 2019-163893, filed on Sep. 9, 2019; the entire contents of which are incorporated herein by reference.

FIELD

Embodiments described herein relate generally to a calculation apparatus, a calculation method, and a computer program product.

BACKGROUND

Various algorithms and hardware have been proposed for solving optimization problems in which variables are represented in discrete values (binary values). It is desirable that the algorithm and hardware for solving the optimization problem are simple in configuration and processing.

There are also optimization problems for which variables are represented by both discrete values and continuous values. For example, the most basic problem in financial engineering is a portfolio optimization problem formulated by a quadratic programming problem. The quadratic programming problem is a continuous optimization problem for which variables are represented by continuous values.

DETAILED DESCRIPTION

Figure 1:
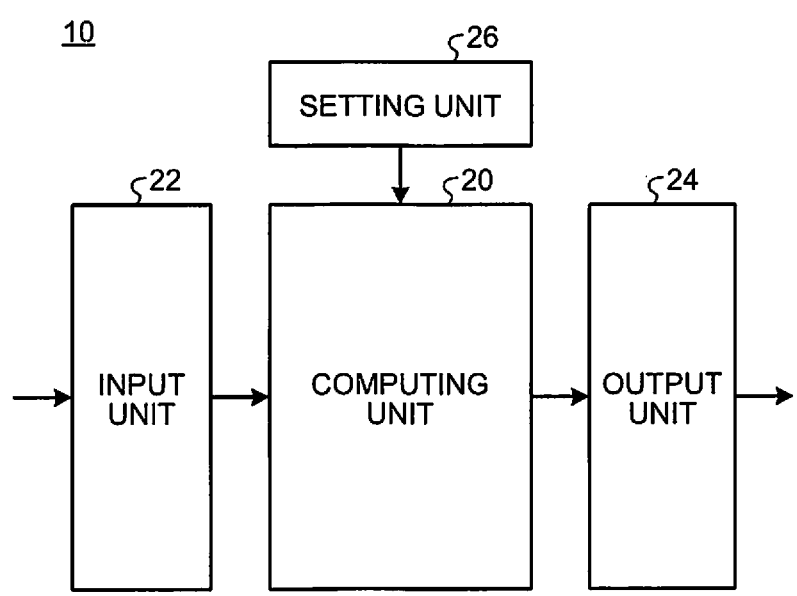
FIG. 1 is a configuration diagram of a calculation apparatus according to a first embodiment.

According to an embodiment, a calculation apparatus includes one or more processing circuits configured to function as a variable calculation unit and a time evolution unit. The variable calculation unit calculates, by using N first intermediate variables obtained by interacting N first variables at a first time and using N second variables at the first time, the N second variables at a second time at which a sampling period elapses from the first time, where N is an integer of 2 or more. The time evolution unit executes a time evolution process to generate the N first variables at the second time. The time evolution unit calculates the N first variables at the second time on the basis of the N second variables at the second time and the N first variables at the first time. Additionally, the time evolution unit changes, if the N first variables at the second time unsatisfy a predetermined constraint condition, the N second variables at the second time in a direction of satisfying the predetermined constraint condition. Hereinafter, a calculation apparatus 10 according to an embodiment will be described in detail with reference to the drawings. The calculation apparatus 10 according to an embodiment aims to solve an optimization problem in which variables are represented by continuous values.

Optimization Problem

First, an optimization problem to be solved by the calculation apparatus 10 will be described. The optimization problem to be solved by the calculation apparatus 10 is a quadratic programming problem including constraints due to K inequalities (K is an integer of 1 or more).

An objective function (E(x)) of the optimization problem to be solved by the calculation apparatus 10 is expressed by Formula (1).

$$E(x) = \sum_{i=1}^{N} \sum_{j=1}^{N} A_{ij} x_i x_j \qquad (1)$$

x represents a variable. N represents the number of variables, where N is an integer of 2 or more. i and j represent the identification numbers of the variables, i and j are arbitrary integers of 1 or more and N or less.

$A_{ij}$ represents an interaction between an i-th variable $x_i$ and a j-th variable $x_j$. $A_{ij}$ is a coefficient of i-th row/j-th column included in a coefficient matrix A which is a matrix of N rows and N columns. The coefficient matrix A is a positive semi-definite symmetric matrix.

Furthermore, an optimization problem to be solved by the calculation apparatus 10 includes constraints due to K inequalities. The calculation apparatus 10 solves the optimization problem while satisfying K inequalities.

For example, the K inequalities are expressed by simultaneous linear inequalities including K inequalities. For example, a k-th inequality (k is an integer of 1 or more and K or less) among the K inequalities is expressed by Formula (2).

$$\sum_{i=1}^{N} B_{ik} x_i \geq 1 \qquad (2)$$

$B_{ik}$ is a coefficient of i-th row/k-th column included in a constraint matrix B of N rows and K columns. $B_{ik}$ represents a coefficient for the i-th variable $x_i$ included in the k-th inequality.

Furthermore, the optimization problem solved by the calculation apparatus 10 may include a constraint that each of the N variables $x_i$ is 0 or more. In this case, the calculation apparatus 10 solves the optimization problem so as to satisfy the expression represented by Formula (3) for all i from 1 to N.

$$x_i \geq 0 \quad (3)$$

Furthermore, the optimization problem solved by the calculation apparatus 10 may include a constraint that normalizes the sum of N variables $x_i$ to 1. In this case, the calculation apparatus 10 solves the optimization problem so as to satisfy the expression represented by Formula (4).

$$\sum_{i=1}^{N} x_i = 1 \quad (4)$$

Hamiltonian H

The present inventors have considered incorporating the above optimization problem into a Hamiltonian H representing the energy of particles moving in an N-dimensional space.

Formula (5) illustrates an example of a Hamiltonian H incorporating an optimization problem.

$$H = \frac{1}{2}\sum_{i=1}^{N} y_i^2 + \frac{1}{2}\sum_{i=1}^{N}\sum_{j=1}^{N} A_{ij}x_ix_j + \sum_{k=1}^{K} \Phi\left(\sum_{i=1}^{N} B_{ik}x_i - \alpha(t)\right) \quad (5)$$

In the Hamiltonian H of Formula (5) has incorporated a constraint by the objective function of Formula (1) and K inequalities of Formula (2), as potential energy.

In Formula (5), the first term on the right side represents kinetic energy of particles. In Formula (5), $y_i$ represents the i-th component of the momentum of the particles.

In Formula (5), the second term on the right side represents potential energy of the particle. In Formula (5), $x_j$ represents the j-th component at the particle position.

The potential energy of the second term on the right side is expressed by an objective function being a quadratic function convex downward, and takes a local minimum at $x_i=0$. Note that ½, which is the coefficient of the second term, may be preliminarily multiplied by N×N coefficients included in the coefficient matrix A.

In Formula (5), the third term on the right side represents the potential energy incorporating the constraints of K inequalities. In Formula (5), t represents time. In Formula (5), t increases from a start time $t_0$ to an end time $t_T$.

$\alpha(t)$, a non-decreasing function with t as a variable, is 0 or more, and becomes 1 at least at the end time $t_T$. For example, $\alpha(t)$ may be a monotonically increasing function that is 0 at the start time $t_0$ and is 1 at the end time $t_T$. Furthermore, $\alpha(t)$ may always be 1 regardless of t.

$\Phi(\xi)$ is a function represented by Formula (6). In Formula (6), $\phi$ is a predetermined constant.

$$\Phi(\xi) = \frac{\phi}{2N\sqrt{K}}\xi^2\theta(-\xi) \quad (6)$$

Furthermore, $\theta(\xi)$ is a function expressed by Formula (7).

$$\theta(\xi) = 0 \ (\xi \leq 0) \quad (7)$$
$$= 1 \ (\xi > 0)$$

The third term on the right side represents the potential energy that changes $x_i$ so as to change $\Sigma^{N}_{i=1}((B_{ik}x_i)-\alpha(t))$ in the positive direction in a case where $-\xi=(-\Sigma^{N}_{i=1}((B_{ik}x_i)-\alpha(t))$ is greater than 0, that is, $\Sigma^{N}_{i=1}(B_{ik}x_i)-\alpha(t))$ is smaller than 0. The third term on the right side is minimized in a case where $-\xi=\{-\Sigma^{N}_{i=1}((B_{ik}x_i)-\alpha(t))\}$ is 0 or less, that is, $\Sigma^{N}_{i=1}((B_{ik}x_i)-\alpha(t))$ is 0 or more.

Here, $\alpha(t)$ is a function that takes 1 at the end time $t_T$. Therefore, the third term on the right side can change $x_i$ so as to satisfy the constraints of K inequalities at the end time $t_T$ in a case where time evolution is applied to the Hamiltonian H. Therefore, in a case where time evolution is applied to the Hamiltonian H illustrated in Formula (5), it is possible to change $x_i$ so as to minimize the objective function in Formula (1) while satisfying the constraints of K inequalities in Formula (2).

Formula (8) illustrates another example of the Hamiltonian H incorporating the optimization problem.

$$H = \frac{1}{2}\sum_{i=1}^{N} y_i^2 + \frac{1}{2}\sum_{i=1}^{N}\sum_{j=1}^{N} A_{ij}x_ix_j + \quad (8)$$
$$\sum_{k=1}^{K} \Phi\left(\sum_{i=1}^{N} B_{ik}x_i - \alpha(t)\right) + \sum_{i=1}^{N} \Psi(x_i) + \frac{\beta}{2N}\left[\sum_{i=1}^{N} x_i - \alpha(t)\right]^2.$$

The Hamiltonian H in Formula (8) has incorporated the objective function in Formula (1), the constraint by K inequalities in Formula (2), the constraint that each of the N variables $x_i$ in Formula (3) is 0 or more, and a constraint that normalizes the sum of N variables $x_i$ in Formula (4) to 1, as potential energy.

In Formula (8), the first term on the right side, the second term on the right side, and the third term on the right side are the same as in Formula (5).

In Formula (8), the fourth term on the right side represents the potential energy that incorporates the constraint that each of the N variables $x_i$ is 0 or more.

$\Psi(\xi)$ is a function represented by Formula (9). In Formula (9), $\psi$ is a predetermined constant.

$$\Psi(\xi) = \frac{\psi}{2}\xi^2\theta(-\xi) \quad (9)$$

The fourth term on the right side represents potential energy that changes $x_i$ in the positive direction in a case where $-\xi=(-x_i)$ is greater than 0, that is, in a case where $x_i$ is smaller than 0. Note that the fourth term on the right side is minimized in a case where $-\xi=(-x_i)$ is 0 or less, that is, where $x_i$ is 0 or more.

In Formula (8), the fifth term on the right side represents the potential energy that incorporates the constraint to normalize the sum of N variables $x_i$ to 1. $\beta$ represents a predetermined constant.

The fifth term on the right side represents the potential energy that changes $x_i$ so as to minimize $(\Sigma^{N}_{i=1}(x_i)-\alpha(t))^2$. Note that the fifth term on the right side is minimized in a case where $(\Sigma^{N}_{i=1}(x_i)-\alpha(t)=0$.

Here, $\alpha(t)$ is a function that takes 1 at the end time $t_T$. Therefore, the fifth term on the right side can change $x_i$ so as to satisfy the constraint to normalize the sum of N variables $x_i$ to 1 at the end time $t_T$ in a case where time evolution is applied to the Hamiltonian H. In a case where time evolution is applied to the Hamiltonian H illustrated in the above Formula (8), it is possible to change $x_i$ so as to minimize the objective function in Formula (1) while satisfying the constraints of Formulas (2), (3), and (4).

The calculation apparatus 10 applies time evolution to the Hamiltonian H as described above from the start time $t_0$ to the end time $t_T$. Subsequently, the calculation apparatus 10 acquires the values of the N position variables $x_i$ from the first to the Nth at the end time $t_T$, and outputs the acquired values as a solution to the optimization problem.

The calculation apparatus 10 simulates the time evolution of the Hamiltonian H by a computation process, for example, and calculates N potentials $x_i$ at the end time $t_T$. The calculation apparatus 10 may apply time evolution to another physical system capable of setting the Hamiltonian H and may acquire N potentials $x_i$ at the end time $t_T$.

First Embodiment

The calculation apparatus 10 according to a first embodiment will be described.

The calculation apparatus 10 according to the first embodiment solves simultaneous ordinary differential equations obtained by partial differentiation of the Hamiltonian H illustrated in Formula (5) with respect to each of the momentum and the position.

The equation of motion obtained by partial differentiation of the Hamiltonian H in Formula (5) is expressed by Formula (10) and Formula (11).

$$\frac{dx_i}{dt} = y_i \tag{10}$$

$$\frac{dy_i}{dt} = -\frac{\partial H}{\partial x_i} = -\sum_{j=1}^{N} A_{ij} x_j - \frac{\phi}{N\sqrt{K}} \sum_{k=1}^{K} B_{ik} r_k \theta(-r_k) \tag{11}$$

In the first embodiment, N represents the number of variables, being an integer of 2 or more. In the first embodiment, i and j represent identification numbers of the variables, being arbitrary integers of 1 or more and N or less.

In the first embodiment, K is an integer of 1 or more. In the first embodiment, k is an arbitrary integer of 1 or more and K or less.

In the first embodiment, $x_i$ corresponds to a variable representing the i-th component of the particle position, and is referred to as a first variable. In the first embodiment, $y_i$ corresponds to a variable representing the i-th component of the momentum of particles and is referred to as a second variable.

In the first embodiment, $A_{ij}$ represents an interaction between the i-th first variable $x_i$ and the j-th first variable $x_j$. $A_{ij}$ is an i-row/j-column coefficient included in the coefficient matrix A of N rows and N columns. The coefficient matrix A is a dense positive semi-definite symmetric matrix. In the first embodiment, N×N coefficients included in the coefficient matrix A are set in advance.

In the first embodiment, $B_{ik}$ represents a coefficient for the i-th first variable $x_i$ included in the k-th inequality among the K inequalities. $B_{ik}$ is a coefficient of i-th row/k-th column included in a constraint matrix B of N rows and K columns. In the first embodiment, K×N coefficients included in the constraint matrix B are set in advance.

In the first embodiment, $r_k$ is expressed by Formula (12).

$$r_k = \sum_{j=1}^{N} B_{jk} x_j - \alpha(t) \tag{12}$$

$\alpha(t)$, a non-decreasing function with t as a variable, is 0 or more, and becomes 1 at least at the end time $t_T$. In the first embodiment, $\alpha(t)$ is 1 regardless of t. $B_{jk}$ is a coefficient of j-th row/k-th column included in the constraint matrix B.

In the first embodiment, $\theta(\xi)$ is expressed by Formula (13).

$$\theta(\xi) = 0 \ (\xi \leq 0) \tag{13}$$
$$= 1 \ (\xi > 0)$$

Therefore, in Formula (11), $\theta(-r_k)$ is 1 in a case where $r_k$ is smaller than 0, and is 0 in a case where $r_k$ is 0 or more. That is, in Formula (11), for arbitrary i, the second term is a value other than 0 in a case where $r_k$ is less than 0, and the second term is 0 in a case where $r_k$ is 0 or more.

The calculation apparatus 10 according to the first embodiment solves the simultaneous ordinary differential equations expressed by Formulas (10) and (11) using a discrete method. More specifically, the calculation apparatus 10 increases t by a sampling period from the start time $t_0$, and updates $x_i$ and $y_i$ by using Formulas (10) and (11) for every t. Subsequently, the calculation apparatus 10 outputs a value of $x_i$ at the end time $t_T$ with sufficiently large t, as a solution. This enables the calculation apparatus 10 to calculate a solution while updating N variables $x_i$ and N variables $y_i$ in parallel.

In Formulas (10) and (11), matrix multiplication for coefficient matrix A having the largest calculation amount is included in Formula (11), but not included in Formula (10). Accordingly, the calculation apparatus 10 only needs to perform matrix multiplication for the coefficient matrix A having the largest calculation amount only for updating $y_i$, and does not need to perform matrix multiplication for updating $x_i$.

In addition, Formula (10) for calculating a time differential value ($dx_i/dt$) of $x_i$ includes $y_i$ but does not include $x_i$. In addition, Formula (11) for calculating a time differential value ($dy_i/dt$) of $y_i$ includes $x_i$ but does not include $y_i$.

That is, in the use of Formulas (10) and (11), $x_i$ and $y_i$ are separated from each other. Therefore, the calculation apparatus 10 can update each of $x_i$ and $y_i$ with application of a stable discrete method with a small calculation amount. For example, the calculation apparatus 10 updates $x_i$ and $y_i$ with application of a symplectic Euler method or the like. Accordingly, the calculation apparatus 10 can calculate the solution of the optimization problem with a simple calculation and a simple configuration.

FIG. 1 is a diagram illustrating a configuration of the calculation apparatus 10 according to the first embodiment. The calculation apparatus 10 includes a computing unit 20, an input unit 22, an output unit 24, and a setting unit 26.

The computing unit 20 is implemented by execution of a program by one or more processing circuits such as a central processing unit (CPU). The computing unit 20 may be a Field Programmable Gate Array (FPGA), a gate array, an application specific integrated circuit (ASIC), or the like, and may further include a processor circuit.

The computing unit 20 increases t, which is a parameter representing time, from the start time $t_0$ (for example, 0) by a sampling period. The computing unit 20 updates the N first variables $x_i$ and the N second variables $y_i$ for each of times. Subsequently, the computing unit 20 outputs the N first variables $x_i$ at the end time $t_T$ that is a predetermined time.

Prior to the computation process of the computing unit 20, the input unit 22 acquires the N first variables $x_i$ at the start time $t_0$ and the N second variables $y_i$ at the start time $t_0$ and gives the acquired variables to the computing unit 20. The N first variables $x_i$ and the N second variables $y_i$ at the start time $t_0$ may be values set in advance, or may be values generated by random numbers, for example.

After completion of the computation process of the computing unit 20, the output unit 24 acquires the N first variables $x_i$ at the end time $t_T$. Subsequently, the output unit 24 outputs the values of the N first variables $x_i$ at the end time $t_T$, as an optimal solution.

Prior to the computation process of the computing unit 20, the setting unit 26 sets each of parameters for the computing unit 20.

Figure 2:
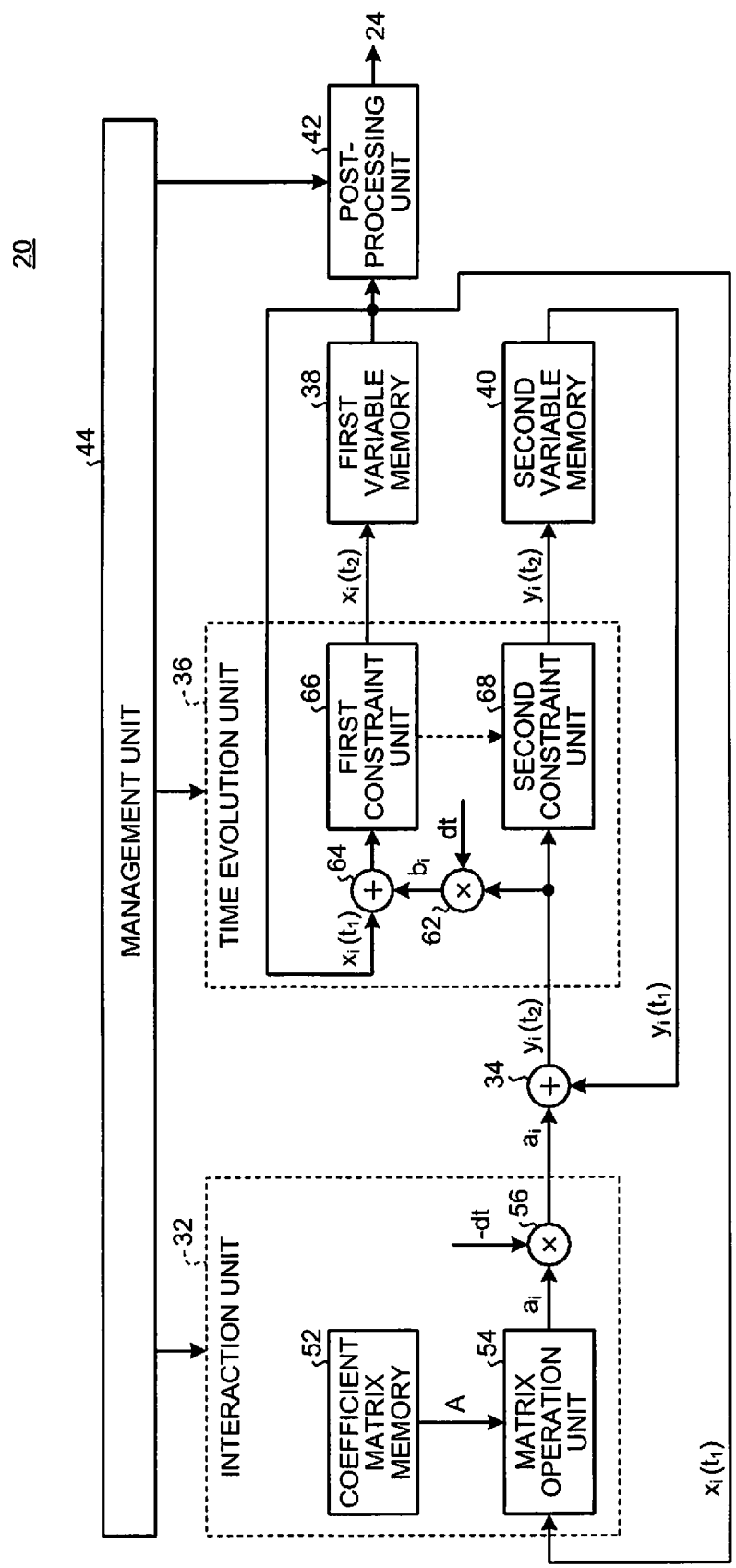
FIG. 2 is a configuration diagram of a computing unit according to the first embodiment.

FIG. 2 is a diagram illustrating a configuration of the computing unit 20 according to the first embodiment. The computing unit 20 sequentially increases the time t from the start time $t_0$ (for example, t=0) to the end time $t_T$ (for example, t=T) at an interval of the sampling period and calculates N first variable $x_i(t)$ and N second variables $y_i(t)$ corresponding to each of the times t. Subsequently, the computing unit 20 outputs the N first variables $x_i(t_T)$ at the end time $t_T$.

The computing unit 20 includes an interaction unit 32, a first addition unit 34, a time evolution unit 36, a first variable memory 38, a second variable memory 40, a post-processing unit 42, and a management unit 44.

The interaction unit 32 acquires N first variables $x_i(t_1)$ at the first time $t_1$ representing an arbitrary time, from the first variable memory 38. The interaction unit 32 multiplies each of the N values calculated by performing matrix computing on the N first variables $x_i(t_i)$ and the coefficient matrix A at the first time $t_1$ by a sign-inverted value of the first time constant dt to generate N first intermediate variables $a_i$. The first time constant dt is a value representing the sampling period.

The interaction unit 32 includes, for example, a coefficient matrix memory 52, a matrix operation unit 54, and a first multiplication unit 56 (first intermediate variable calculation unit). The coefficient matrix memory 52 stores a coefficient matrix A. The coefficient matrix A is set in advance by a user or the like.

The matrix operation unit 54 acquires N first variables $x_i(t_i)$ at the first time $t_1$ from the first variable memory 38. The matrix operation unit 54 performs matrix operation on the N first variables $x_i(t_1)$ at the first time $t_1$ and the coefficient matrix A stored in the coefficient matrix memory 52 and calculates N values $a_i'$.

In the first multiplication unit 56 has a sign-inverted value of the first time constant dt, set in advance. The first multiplication unit 56 acquires N values $a_i'$ from the matrix operation unit 54. Subsequently, the first multiplication unit 56 multiples each of N values $a_i'$ by a sign-inverted value of the first time constant dt, and calculates N first intermediate variables $a_i$.

The first addition unit 34 acquires N second variables $y_i(t_1)$ at the first time $t_1$ from the second variable memory 40. The first addition unit 34 acquires N first intermediate variables $a_i$ from the interaction unit 32. Subsequently, the first addition unit 34 adds a corresponding first intermediate variable $a_i$ among the N first intermediate variables $a_i$ to each of the N second variables $y_i(t_1)$ at the first time $t_1$, and calculates N second variables $y_i(t_2)$ at the second time $t_2$ at which the sampling period elapses from the first time $t_1$.

The time evolution unit 36 acquires N second variables $y_i(t_2)$ at the second time $t_2$ from the first addition unit 34. The time evolution unit 36 acquires N first variables $x_i(t_1)$ at the first time $t_1$ from the first variable memory 38. On the basis of the N second variables $y_i(t_2)$ at the second time $t_2$, the time evolution unit 36 applies time evolution on the N first variables $x_i(t_1)$ at the first time $t_1$ to N first variable $x_i(t_2)$ at the second time $t_2$.

Furthermore, in a case where the N first variables $x_i(t_2)$ at the second time $t_2$ do not satisfy the constraint condition set in advance, the time evolution unit 36 changes the N first variables $x_i(t_2)$ at the second time $t_2$ in a direction of satisfying the constraint condition. Furthermore, in a case where the N first variables $x_i(t_2)$ at the second time $t_2$ do not satisfy the constraint condition, the time evolution unit 36 changes the N second variables $y_i(t_2)$ at the second time $t_2$ in a direction of satisfying the constraint condition.

Subsequently, the time evolution unit 36 stores, in the first variable memory 38, the N first variables $x_i(t_2)$ at the second time $t_2$ after being changed in the direction that has satisfied or satisfies the constraint condition. In addition, the time evolution unit 36 stores, in the second variable memory 40, the N second variables $y_i(t_2)$ at the second time $t_2$ after being changed in the direction that has satisfied or satisfies the constraint condition.

The time evolution unit 36 includes a second multiplication unit 62 (second intermediate variable calculation unit), a second addition unit 64, a first constraint unit 66, and a second constraint unit 68, for example.

The second multiplication unit 62 has a first time constant dt set in advance. The second multiplication unit 62 acquires N second variables $y_i(t_2)$ at the second time $t_2$ from the first addition unit 34. The second multiplication unit 62 multiplies each of the N second variables $y_i(t_2)$ at the second time $t_2$ by the first time constant dt and calculates N second intermediate variables $b_i$.

The second addition unit 64 acquires N first variables $x_i(t_i)$ at the first time $t_1$ from the first variable memory 38. In addition, the second addition unit 64 acquires N second intermediate variables $b_i$ from the second multiplication unit 62. Subsequently, the second addition unit 64 adds a corresponding second intermediate variable $b_i$ among the N second intermediate variables $b_i$ to each of the N first variables $x_i(t_i)$ at the first time $t_1$, and calculates N first variables $x_i(t_2)$ at the second time $t_2$.

The first constraint unit 66 acquires N first variables $x_i(t_2)$ at the second time $t_2$ from the second addition unit 64. The first constraint unit 66 decides whether the N first variables $x_i(t_2)$ at the second time $t_2$ satisfy the constraint condition. In a case where the N first variables $x_i(t_2)$ at the second time $t_2$ satisfy the constraint condition, the first constraint unit 66 controls to directly store the N first variables $x_i(t_2)$ at the second time $t_2$ acquired from the second addition unit 64, in the first variable memory 38.

In a case where the N first variables $x_i(t_2)$ at the second time $t_2$ do not satisfy the constraint condition, the first constraint unit 66 changes the N first variables $x_i(t_2)$ at the second time $t_2$ acquired from the second addition unit 64 in a direction of satisfying the constraint condition. In a case where the N first variables $x_i(t_2)$ at the second time $t_2$ do not satisfy the constraint condition, the first constraint unit 66 stores the N first variables $x_i(t_2)$ at the second time $t_2$ after changing the first variables $x_i(t_2)$ in the direction satisfying the constraint condition, in the first variable memory 38. Note that, the N first variables $x_i(t_2)$ at the second time $t_2$ after the change do not need to satisfy the constraint condition as long as the first constraint unit 66 at least changes the first variables $x_i(t_2)$ in a direction of satisfying the constraint condition.

The second constraint unit 68 acquires N second variables $y_i(t_2)$ at the second time $t_2$ from the first addition unit 34. The second constraint unit 68 decides whether the N first variables $x_i(t_2)$ at the second time $t_2$ satisfy the constraint condition. The second constraint unit 68 may decide whether the N first variables $x_i(t_2)$ at the second time $t_2$ satisfy the constraint condition on the basis of a decision result obtained by the first constraint unit 66. In a case where the N first variables $x_i(t_2)$ at the second time $t_2$ satisfy the constraint condition, the second constraint unit 68 directly stores the N second variables $y_i(t_2)$ at the second time $t_2$ acquired from the first addition unit 34, in the second variable memory 40.

In a case where the N first variables $x_i(t_2)$ at the second time $t_2$ do not satisfy the constraint condition, the second constraint unit 68 changes the N second variables $y_i(t_2)$ at the second time $t_2$ acquired from the first addition unit 34 in a direction of satisfying the constraint condition. In a case where the N first variables $x_i(t_2)$ at the second time $t_2$ do not satisfy the constraint condition, the second constraint unit 68 stores the N second variables $y_i(t_2)$ at the second time $t_2$ after changing the second variables $y_i(t_2)$ in a direction satisfying the constraint condition, in the second variable memory 40.

Here, the constraint condition is expressed by simultaneous linear inequalities including K inequalities. Each of the K inequalities includes, as variables, a plurality of first variables $x_i$ that are 1 or more and N or less among the N first variables $x_i$.

The first constraint unit 66 and the second constraint unit 68 decide whether the inequality is satisfied for each of the K inequalities. Subsequently, in a case where inequality is not satisfied for each of the K inequalities, the first constraint unit 66 changes a plurality of first variable $x_i$ included in the inequalities among the N first variables $x_i(t_2)$ at the second time $t_2$ in a direction of satisfying the inequality. In addition, in a case where inequality is not satisfied for each of the K inequalities, the second constraint unit 68 changes a plurality of second variables $y_i$ corresponding to the plurality of first variables $x_i$ included in the inequalities among the N second variables $y_i(t_2)$ at the second time $t_2$ in a direction of satisfying the inequality.

The first variable memory 38 stores N first variables $x_i(t)$ at each of times from the start time $t_0$ to the end time $t_T$. Note that the N first variables $x_i(t)$ at each of times will not be used in calculation after the N first variables $x_i$ (t+dt) at the next time have been calculated. Therefore, after storage of the N first variables $x_i(t)$ at each of times in the first variable memory 38, the N first variables $x_i(t)$ before that time may be deleted.

The second variable memory 40 stores N second variables $y_i(t)$ at each of times from the start time $t_0$ to the end time $t_T$. Note that the N second variables $y_i(t)$ at each of times will not be used in calculation after the N second variables $y_i(t+dt)$ at the next time have been calculated. Therefore, after storage of the N second variables $y_i(t)$ at each of times in the second variable memory 40, the N second variables $y_i(t)$ before that time may be deleted.

After the N first variables $x_i$ at the end time $t_T$ have been calculated, the post-processing unit 42 acquires the N first variables $x_i$ at the end time $t_T$ from the first variable memory 38. The post-processing unit 42 decides whether the N first variables $x_i$ at the end time $t_T$ satisfy the constraint condition.

In a case where the N first variables $x_i$ at the end time $t_T$ satisfy the constraint condition, the post-processing unit 42 directly outputs the N first variables $x_i(t_T)$ at the end time $t_T$ acquired from the first variable memory 38, to the output unit 24.

In a case where the N first variables $x_i$ at the end time $t_T$ do not satisfy the constraint condition, the post-processing unit 42 changes the N first variables $x_i(t_T)$ at the end time $t_T$ acquired from the first variable memory 38 in a direction of satisfying the constraint condition until the N first variables $x_i(t_T)$ at the end time $t_T$ satisfies the constraint condition. Subsequently, the post-processing unit 42 outputs the N first variables $x_i(t_T)$ at the end time $t_T$ that satisfies the constraint condition to the output unit 24.

For example, the post-processing unit 42 repeats a plurality of times the correction process of changing the N first variables $x_i$ in a direction of satisfying the constraint condition until the N first variables $x_i$ satisfy the constraint condition. The constraint condition is expressed by K inequalities. Therefore, the post-processing unit 42 decides whether the inequality is satisfied for each of the K inequalities in each of correction processes. In a case where the inequality is not satisfied, the post-processing unit 42 changes a plurality of first variables $x_i$ included in the inequality among the N first variables $x_i(t_T)$ at the end time $t_T$, in a direction of satisfying the inequality.

The management unit 44 manages the timing of processing performed by the interaction unit 32, the time evolution unit 36, and the post-processing unit 42. The management unit 44 sequentially increases the time at intervals of the sampling period from the start time $t_0$ to the end time $t_T$. Subsequently, the management unit 44 manages the processes performed by the interaction unit 32, the time evolution unit 36, and the post-processing unit 42 so as to calculate N first variables $x_i$ and N second variables $y_i$ for each of times.

The computing unit 20 configured as described above outputs the N first variables $x_i(t_T)$ at the end time $t_T$ output from the post-processing unit 42, to the output unit 24. The output unit 24 outputs the N first variables $x_i(t_T)$ at the end time $t_T$ received from the computing unit 20 to the external device.

Figure 3:
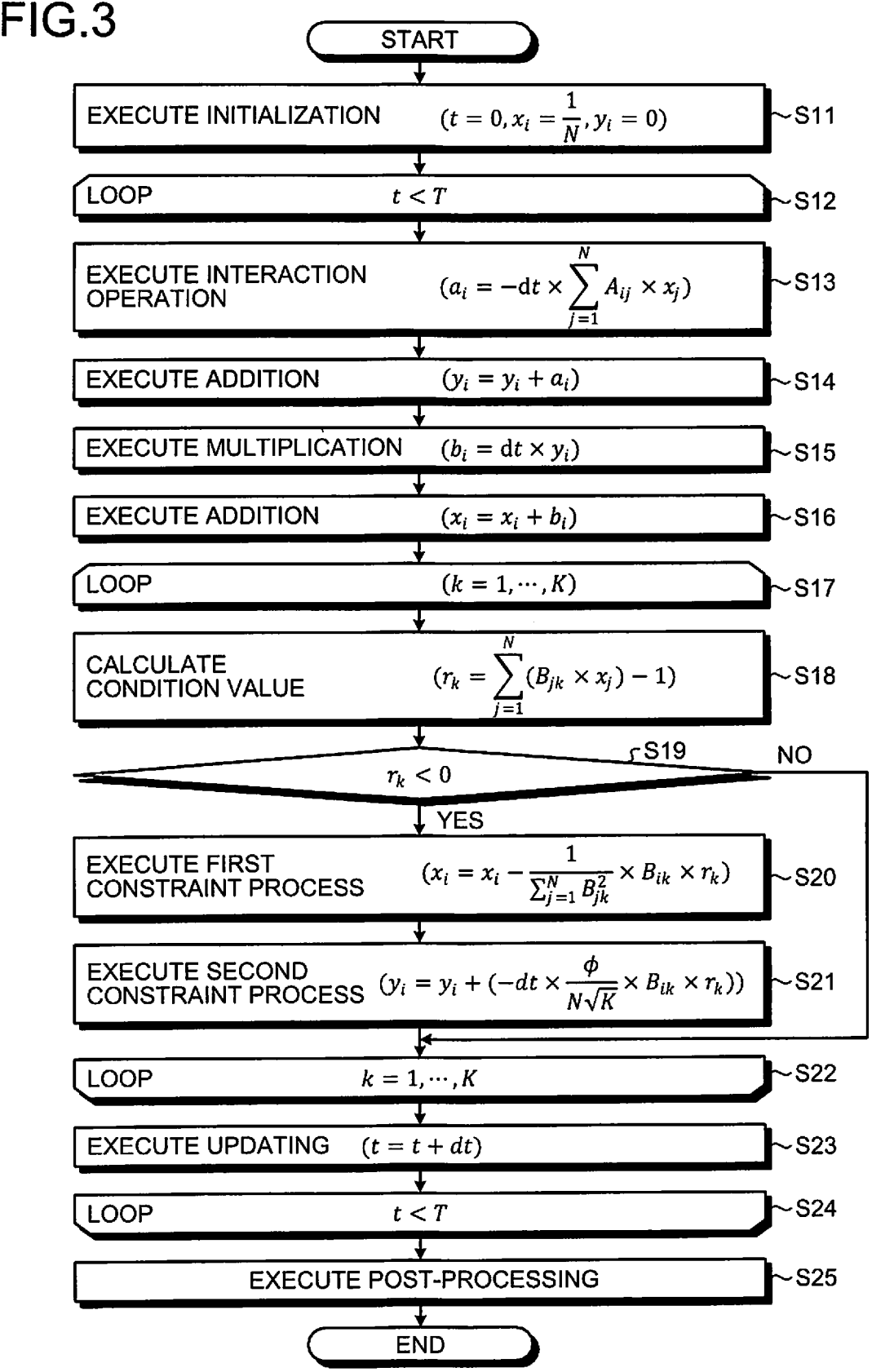
FIG. 3 is a flowchart illustrating a process flow of a computing unit according to the first embodiment.

FIG. 3 is a flowchart illustrating a process flow of the computing unit 20 according to the first embodiment. The computing unit 20 according to the first embodiment executes the process in the flow illustrated in FIG. 3. In the present example, the computing unit 20 executes a process in which $\alpha(t)$ is fixed to 1 regardless of the time t.

First, in S11, the computing unit 20 initializes the time t, the N first variables $x_i$, and the N second variables $y_i$. For example, the computing unit 20 sets the time t to 0. In addition, the computing unit 20 sets each of the N first variables $x_i$ to 1/N. In addition, the computing unit 20 sets each of the N second variables $y_i$ to 0. Note that the computing unit 20 may initialize each of the N first variables $x_i$ and each of the N second variables $y_i$ to values acquired by the input unit 22 from the outside.

Subsequently, the computing unit 20 repeats the process from S13 to S23 until the time t reaches T set in advance (loop process between S12 and S24). T is a value representing the end time $t_T$.

In S13, the interaction unit 32 executes interaction operation and generates N first intermediate variables $a_i$. As the interaction operation, the computing unit 20 multiplies each of N values calculated by performing matrix computing on the N first variables $x_i$ and the coefficient matrix A by the sign-inverted value of the first time constant dt. For example, in S13, the interaction unit 32 executes the computation of Formula (14) for each of i=1 to N.

$$a_i = -dt \times \sum_{j=1}^{N} A_{ij} \times x_j \qquad (14)$$

Subsequently, in S14, the first addition unit 34 adds a corresponding first intermediate variable $a_i$ among the N first intermediate variables $a_i$ to each of the N second variables $y_i$, and calculates N second variables $y_i$. For example, in S14, the first addition unit 34 executes computation of Formula (15) for each of i=1 to N.

$$y_i = y_i + a_i \qquad (15)$$

Subsequently, in S15, the time evolution unit 36 generates N second intermediate variables $b_i$ obtained by multiplying each of the N second variables $y_i$ by the first time constant dt. For example, in S15, the time evolution unit 36 executes the computation of Formula (16) for each of i=1 to N.

$$b_i = dt \times y_i \qquad (16)$$

Subsequently, in S16, the time evolution unit 36 adds the corresponding second intermediate variable bi among the N second intermediate variables bi to each of the N first variables $x_i$. For example, in S16, the time evolution unit 36 executes the computation of Formula (17) for each of i=1 to N.

$$x_i = x_i + b_i \qquad (17)$$

Subsequently, the time evolution unit 36 repeatedly executes the process from S18 to S21 K times (loop process between S17 and S22). This enables the time evolution unit 36 to execute the inequality determination process and the constraint process for each of the K inequalities. In the present flow, K represents the number of repetitions in the loop.

In S18, the time evolution unit 36 calculates a condition value $r_k$ for determining whether the k-th inequality among the K inequalities is satisfied. For example, in S18, the time evolution unit 36 executes computation of Formula (18).

$$r_k = \sum_{j=1}^{N} (B_{jk} \times x_j) - 1 \qquad (18)$$

Subsequently, in S19, the time evolution unit 36 decides whether the k-th inequality is satisfied. More specifically, the time evolution unit 36 decides whether the condition value $r_k$ is smaller than 0. In a case where the k-th inequality is not satisfied, that is, where the condition value $r_k$ is smaller than 0 (Yes in S19), the time evolution unit 36 executes the processes of S20 and S21.

In a case where the k-th constraint is satisfied, that is, where the condition value $r_k$ is not smaller than 0 (No in S19), the time evolution unit 36 will not execute the processes in S20 and S21.

In S20, the time evolution unit 36 executes a first constraint process. That is, the time evolution unit 36 changes the N first variables $x_i$ in a direction of satisfying the constraint condition. For example, in S20, the time evolution unit 36 executes the computation of Formula (19) for each of i=1 to N.

$$x_i = x_i - \frac{1}{\sum_{j=1}^{N} B_{jk}^2} \times B_{ik} \times r_k \qquad (19)$$

In S21, the time evolution unit 36 executes a second constraint process. That is, the time evolution unit 36 changes the N second variables $y_i$ in a direction of satisfying the constraint condition. For example, in S21, the time evolution unit 36 executes the computation of Formula (20) for each of i=1 to N.

$$y_i = y_i + \left( -dt \times \frac{\phi}{N\sqrt{K}} \times B_{ik} \times r_k \right) \qquad (20)$$

In a case where the process from S18 to S21 is repeated K times, the time evolution unit 36 exits the loop process between S17 and S22 and moves the process to S23.

In S23, the computing unit 20 updates the time t. For example, the computing unit 20 adds the first time constant dt to the time t.

In S24, the computing unit 20 decides whether the time t is T or more. In a case where the time t is T or more, the computing unit 20 exits the loop process between S12 and S24 and moves the process to S25.

In S25, the computing unit 20 executes post-processing. In a case where the N first variables $x_i$ do not satisfy the constraint condition in the post-processing, the computing unit 20 corrects the N first variables $x_i$ so as to satisfy the constraint condition. For example, the computing unit 20 uses the gradient descent method to execute a correction process that changes the N first variables $x_i$ in a direction of satisfying the constraint condition. Subsequently, the computing unit 20 repeats such correction process until the N first variables $x_i$ satisfy the constraint condition.

After completing the process of S25, the computing unit 20 finishes the present flow.

Figure 4:
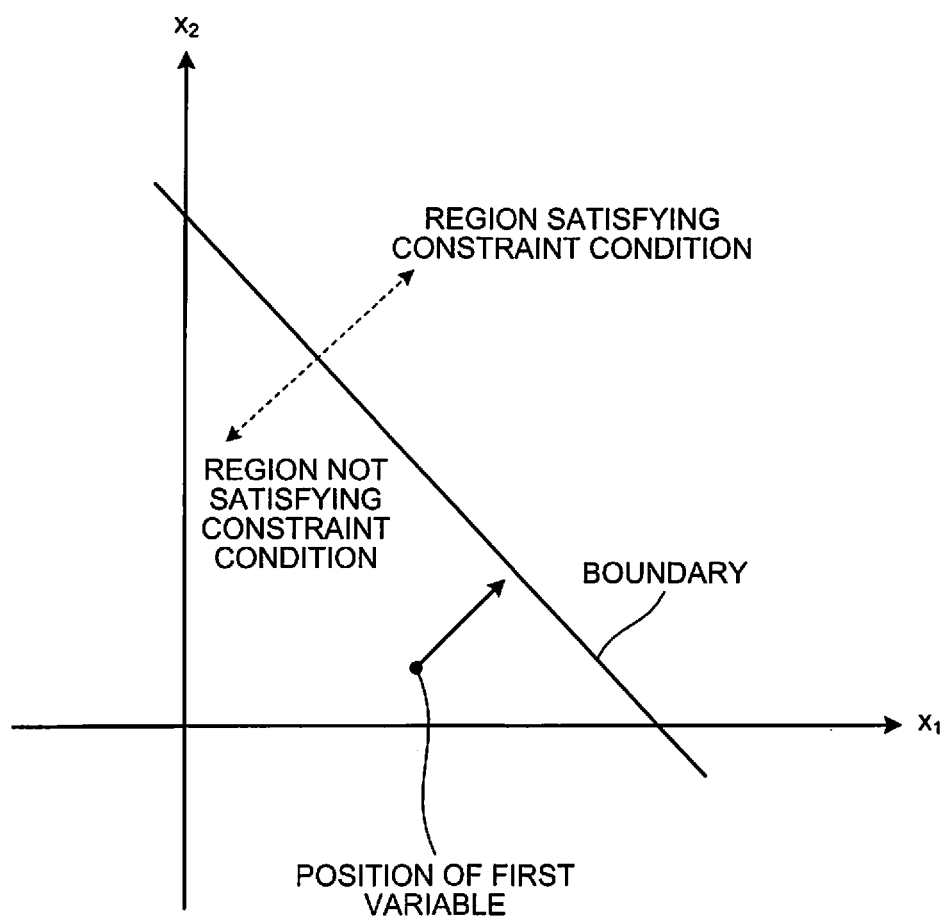
FIG. 4 is a diagram illustrating a process of changing a first variable in a direction of satisfying a constraint condition.

FIG. 4 is a diagram illustrating a process of changing N first variables $x_i$ and N second variables $y_i$ in a direction of satisfying the constraint conditions. In S20, the time evolution unit 36 changes the N first variables $x_i$ in a direction of satisfying the constraint condition. In S21, the time evolution unit 36 changes the N second variables $y_i$ in a direction of satisfying the constraint condition.

For example, in a case where N=2, the constraint condition is expressed by, for example, a linear inequality. In this case, the boundary between the region that satisfies the constraint condition and the region that does not satisfy the constraint condition is expressed by a linear equation as illustrated in FIG. 4. The time evolution unit 36 changes the position represented by the N first variables $x_i$ in a direction approaching perpendicularly to the boundary represented by the inequality in a case where the constraint condition is not satisfied (in a case where the inequality is not satisfied). Moreover, in a case where the constraint condition is not satisfied (in a case where the inequality is not satisfied), the time evolution unit 36 changes N second variables $y_i$ in a direction in which the position represented by the N first variables $x_i$ approaches the boundary represented by the inequality.

In addition, in a case where the constraint condition is expressed by simultaneous linear inequalities including K inequalities, the time evolution unit 36 executes the processes of S20 and S21 for each of the K inequalities. That is, in a case where the inequality is not satisfied, the time evolution unit 36 changes the first variable $x_i$ in a direction in which the position represented by the plurality of first variables included in the inequality among the N first variables $x_i$ at the second time approaches perpendicularly to the boundary represented by the inequality, and changes a plurality of second variables $y_i$ corresponding to the plurality of first variables included in the inequality.

In addition, in a case where the N first variables $x_i$ are corrected so as to satisfy the constraint condition in the post-processing, the computing unit 20 may execute a similar process.

Figure 5:
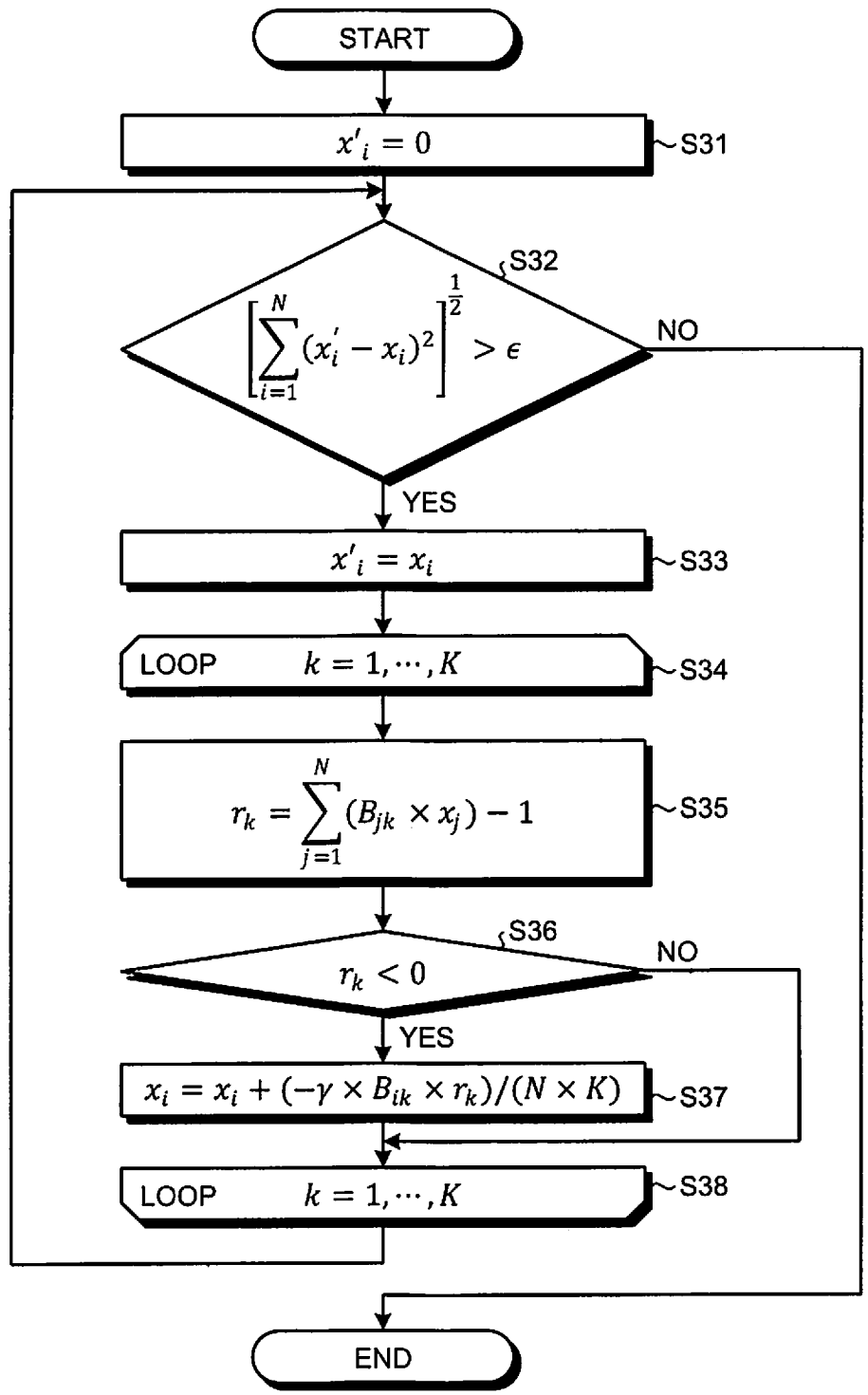
FIG. 5 is a flowchart illustrating a process flow of a post-processing unit according to the first embodiment.

FIG. 5 is a flowchart illustrating a process flow of the post-processing unit 42 according to the first embodiment. The post-processing unit 42 according to the first embodiment executes the process according to the flow illustrated in FIG. 5.

First, in S31, the post-processing unit 42 initializes all N reference variables $x_i'$ to 0. N reference variables $x_i'$ represent N first variables $x_i$ before being changed by the immediately preceding correction process.

Subsequently, the post-processing unit 42 decides in S32 whether the N first variables $x_i$ have changed due to the immediately preceding correction process. In a case where there has been a change (Yes in S32), the post-processing unit 42 moves the process to S33 and re-executes the correction process. In a case where there is no change (No in S32), the post-processing unit 42 decides that the N first variables $x_i$ satisfy the constraint condition, and finishes the present flow.

For example, in S32, the post-processing unit 42 executes a determination process expressed in Formula (21).

$$\left[\sum_{i=1}^{N} (x_i' - x_i)^2\right]^{\frac{1}{2}} > \epsilon \tag{21}$$

In Formula (21), the post-processing unit 42 calculates a square error between the N reference variables $x_i'$ and the N first variables $x_i$ after the correction process. Subsequently, in a case where the square root of the square error is not greater than a tolerable error $\epsilon$ (No in S32), the post-processing unit 42 decides that the N first variables $x_i$ satisfy the constraint condition, and finishes the present flow. In contrast, in a case where the square root of the square error is greater than the tolerable error $\epsilon$, the post-processing unit 42 moves the process to S33 and re-executes the correction process. The tolerable error E is, for example, a machine epsilon, being a difference between 1 and a minimum machine-treatable value greater than 1.

In S33, the post-processing unit 42 substitutes the N first variables $x_i$ for the N reference variables $x_i'$.

Subsequently, the post-processing unit 42 executes the processing from S35 to S37 repeatedly K times (loop process between S34 and S38). This enables the post-processing unit 42 to execute the inequality determination process and the constraint process for each of the K inequalities.

The post-processing unit 42 calculates in S35 a condition value rk for determining whether the k-th inequality among K inequalities is satisfied. For example, in S35, the post-processing unit 42 executes computation of Formula (22).

$$r_k = \sum_{j=1}^{N} (B_{jk} \times x_j) - 1 \tag{22}$$

Subsequently, in S36, the post-processing unit 42 determines whether the k-th inequality is satisfied. More specifically, the post-processing unit 42 determines whether the condition value $r_k$ is smaller than 0. In a case where the k-th inequality is not satisfied, that is, in a case where the condition value $r_k$ is smaller than 0 (Yes in S36), the post-processing unit 42 will execute the process in S37.

In a case where the k-th constraint is satisfied, that is, in a case where the condition value $r_k$ is not smaller than 0 (No in S36), the post-processing unit 42 will not execute the process in S37.

In S37, the post-processing unit 42 executes a correction process. That is, the post-processing unit 42 changes the N first variables $x_i$ in a direction of satisfying the constraint condition. For example, in S37, the post-processing unit 42 executes computation of Formula (23) for each of i=1 to N. In Formula (23), γ is a predetermined constant.

$$x_i = x_i - \gamma \times B_{ik} \times r_k / (N \times K) \tag{23}$$

In a case where the processes from S35 to S37 are repeated K times, the post-processing unit 42 exits the loop process between S34 and S38 and returns the process to S32.

The calculation apparatus 10 according to the first embodiment as described above can solve a quadratic programming problem including constraints by K inequalities.

Second Embodiment

The calculation apparatus 10 according to a second embodiment will be described. The calculation apparatus 10 according to the second embodiment has substantially the same configuration as in the calculation apparatus 10 according to the first embodiment. Accordingly, blocks having substantially the same configuration are denoted by the same reference numerals, and detailed description will be omitted except for differences.

Figure 6:
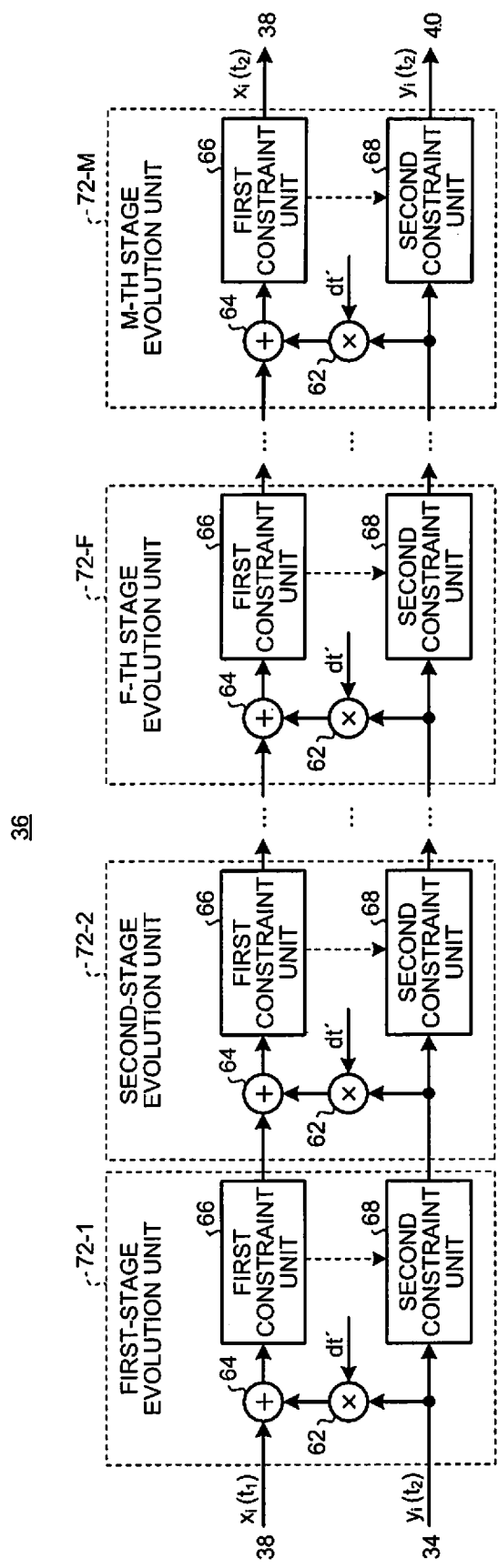
FIG. 6 is a configuration diagram of a time evolution unit according to a second embodiment.

FIG. 6 is a diagram illustrating a configuration of the time evolution unit 36 according to the second embodiment. The calculation apparatus 10 according to the second embodiment differs from the first embodiment in the configuration of the time evolution unit 36.

The time evolution unit 36 according to the second embodiment executes M times (M is an integer of 2 or more) of time evolution processes on the N first variables $x_i(t_1)$ at the first time $t_1$, and generates N first variables $x_i(t_2)$ at the second time $t_2$. The time evolution unit 36 according to the second embodiment includes M stages of evolution units 72-1 to 72-M connected in series.

The first evolution unit 72-1 acquires N first variables $x_i(t_1)$ at the first time $t_1$ from the first variable memory 38. In addition, the first-stage evolution unit 72-1 acquires N second variables $y_i(t_2)$ at the second time $t_2$ from the first addition unit 34. Subsequently, a first-stage evolution unit 72-1 executes the first time evolution process, and outputs N first variables $x_i(t_1+dt')$ at the time $(t_1+dt')$ at which a minute period of 1/M of the sampling period elapses from the first time $t_1$. In addition, the first-stage evolution unit 72-1 executes the first time evolution process and outputs N second variables $y_i(t_2)$ at the second time $t_2$.

The evolution unit 72-f of the f-th stage (f is an integer of 2 or more and M−1 or less) acquires, at the first time $t_1$ from the evolution unit 72-(f−1) of the (f−1)-th stage, N first variables $x_i(t_1+(f-1)\times dt')$ at a time $(t_1+(f-1)\times dt')$ at which a time being f−1 times the minute period elapses. The evolution unit 72-f at the f-th stage acquires N second variables $y_i(t_2)$ at the second time $t_2$ from the evolution unit 72-(f−1) of the (f−1)-th stage. Subsequently, the f-th stage evolution unit 72-f executes the f-th time evolution process, and outputs N first variables $x_i(t_1+f\times dt')$ at the time $(t_1+f\times dt')$ at which time being f times the minute period elapses from the first time $t_1$. In addition, the f-stage evolution unit 72-f executes the f-th time evolution process, and outputs N second variables $y_i(t_2)$ at the second time $t_2$.

The M-th stage evolution unit 72-M acquires, at the first time $t_1$, N first variable $x_i(t_1+(M-1)\times dt')$ at time $(t_1+(M-1)\times dt')$ at which time being (M−1) times the minute period elapses, from a (M−1)-th stage evolution unit 72-(M−1). In addition, the M-th stage evolution unit 72-M acquires N second variables $y_i(t_2)$ at the second time $t_2$ from the (M−1)-th stage evolution unit 72-(M−1). Subsequently, the M-th stage evolution unit 72-M executes the M-th time evolution process and outputs the N first variables $x_i(t_2)$ at the second time $t_2$. In addition, the M-th stage evolution unit 72-M executes the M-th time evolution process, and outputs N second variables $y_i(t_2)$ at the second time $t_2$.

Each of the M-stage evolution units 72-1 to 72-M includes the same configuration as the time evolution unit 36 according to the first embodiment. That is, each of the M-stage evolution units 72-1 to 72-M includes the second multiplication unit 62, the second addition unit 64, the first constraint unit 66, and the second constraint unit 68. However, each of the M-stage evolution units 72-1 to 72-M performs processing by replacing the first time constant dt in the first embodiment with a second time constant dt' representing a minute period.

Accordingly, the evolution unit 72-m of the m-th stage (m is an integer of 1 or more and M or less) executes the following process in the m-th time evolution process among the M time evolution processes.

That is, the m-th stage evolution unit 72-m multiplies each of the N second variables $y_i(t_2)$ at the second time $t_2$ output in the (m−1)-th time evolution process by the N second time constant dt' and calculates N second intermediate variables $b_i$. In a case where m=1, the m-th stage evolution unit 72-m multiplies each of the N second variables $y_i(t_2)$ at the second time $t_2$ acquired from the first addition unit 34 by the N second time constants dt' and calculates the N second intermediate variables $b_i$.

The m-th stage evolution unit 72-m adds a corresponding second intermediate variable $b_i$ among the N second intermediate variables $b_i$ to each of the N first variables $x_i(t_1+(m-1)\times dt')$ at time $(t_1+(m-1)\times dt')$ at which time being (m−1) times the minute period elapses from the first time $t_i$, and calculates N first variables $x_i(t_1+m\times dt')$ at a m-th elapsed time $(t_1+m\times dt')$ at which time being m times the minute period elapses from the first time $t_1$.

The m-th stage evolution unit 72-m determines whether the N first variables $x_i(t_1+m\times dt')$ at the m-th elapsed time $(t_1+m\times dt')$ satisfy the constraint condition. In a case where the constraint condition is satisfied, the m-th stage evolution unit 72-m directly outputs the N first variables $x_i(t_1+m\times dt')$ at the m-th elapsed time $(t_1+m\times dt')$. In addition, in a case where the constraint condition is satisfied, the m-th stage evolution unit 72-m directly outputs the N second variables $y_i(t_2)$ at the acquired second time $t_2$.

In a case where the constraint condition is not satisfied, the m-th stage evolution unit 72-m changes the N first variables $x_i(t_1+m\times dt')$ at the m-th elapsed time $(t_1+m\times dt')$ in a direction of satisfying the constraint conditions and then outputs the N first variables $x_i(t_1+m\times dt')$. In addition, in a case where the constraint condition is not satisfied, the m-th stage evolution unit 72-m changes the N second variables $y_i(t_2)$ at the acquired second time $t_2$ in a direction of satisfying the constraint condition and then outputs the N second variables $y_i(t_2)$.

The m-th stage evolution unit 72-m performs the process of changing the variables in a direction of satisfying the constraint condition in a manner similar to the time evolution unit 36 according to the first embodiment. Note that the m-th stage evolution unit 72-m performs processing by replacing the first time constant dt in the first embodiment with the second time constant dt'.

Figure 7:
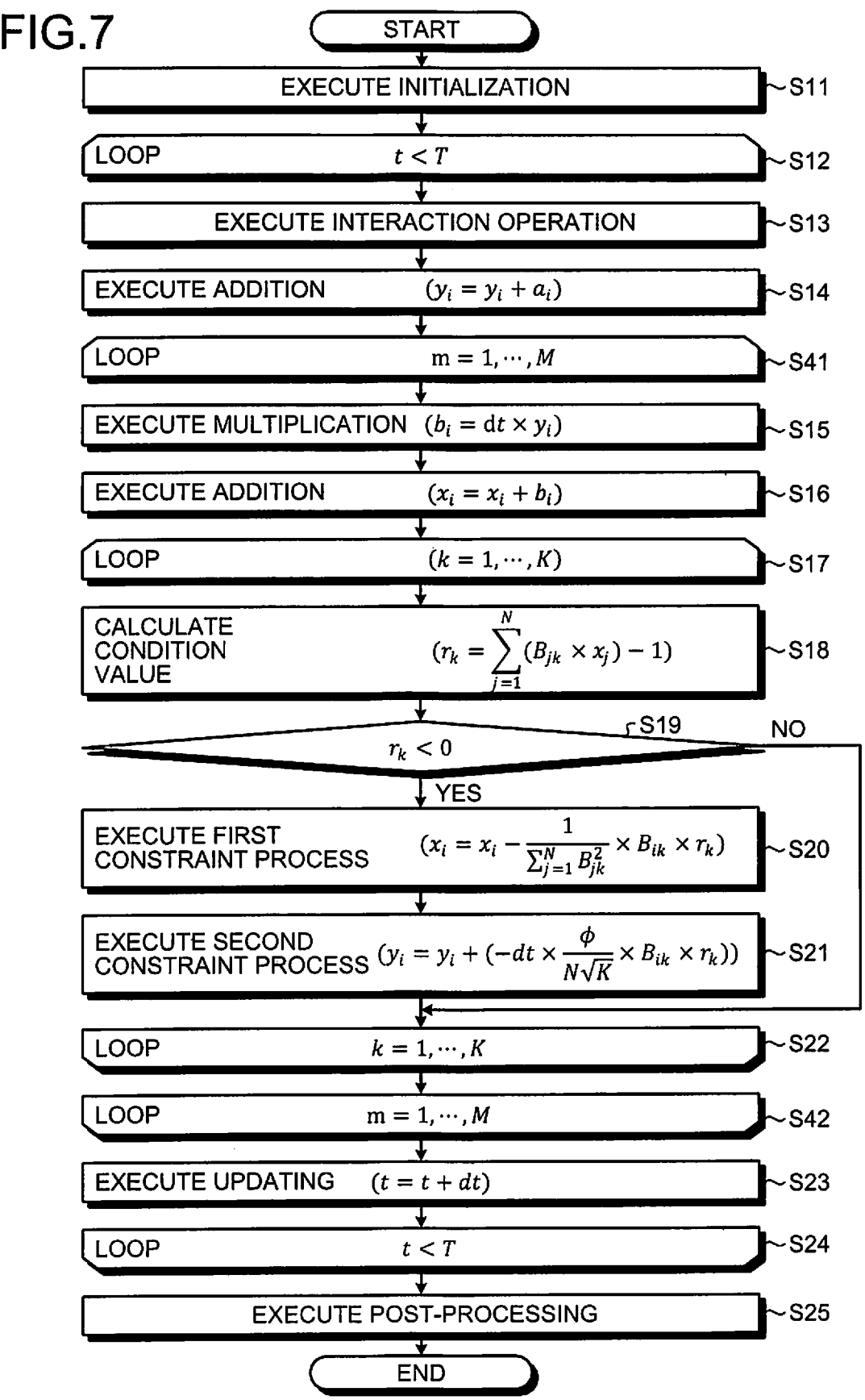
FIG. 7 is a flowchart illustrating a process flow of a computing unit according to the second embodiment.

FIG. 7 is a flowchart illustrating a process flow of the computing unit 20 according to the second embodiment. The computing unit 20 according to the second embodiment executes the process in the flow illustrated in FIG. 7. Compared with the flowchart of FIG. 3, the flowchart of FIG. 7 has an additional M loops of start process (S41) between S14 and S15, and has additional M loops of end process (S42) between S22 and S23.

The time evolution unit 36 according to the second embodiment executes M times of the process from S15 to S22 in repetition after the process of S14 (loop process between S41 and S42). This enables the time evolution unit 36 to execute the time evolution process M times in repetition.

Note that, in the processes from S15 to S22, the time evolution unit 36 uses the second time constant dt' to perform the process that is performed using the first time constant dt in the first embodiment.

More specifically, the time evolution unit 36 generates in S15 N second intermediate variables $b_i$ obtained by multiplying each of the N second variables $y_i$ by the second time constant dt'. For example, in S15, the time evolution unit 36 executes computation of Formula (24) for each of i=1 to N.

$$b_i = dt' \times y_i \tag{24}$$

In addition, for example, the time evolution unit 36 executes in S21 computation of Formula (25) for each of i=1 to N.

$$y_i = y_i + \left(-dt' \times \frac{\phi}{N\sqrt{K}} \times B_{ik} \times r_k\right) \tag{25}$$

The calculation apparatus 10 according to the second embodiment as described above can use a simulation to solve a quadratic programming problem including constraints by K inequalities.

Third Embodiment

The calculation apparatus 10 according to a third embodiment will be described. The calculation apparatus 10 according to the third embodiment has substantially the same configuration as in the calculation apparatus 10 according to the second embodiment. Accordingly, blocks having substantially the same configuration are denoted by the same reference numerals, and detailed description will be omitted except for differences.

The calculation apparatus 10 according to the third embodiment solves the simultaneous ordinary differential equations expressed in Formulas (26) and (27).

$$\frac{dx_i}{dt} = y_i \qquad (26)$$

$$\frac{dy_i}{dt} = -\sum_{j=1}^{N} A_{ij} x_j - \frac{\phi}{N\sqrt{M}} \sum_{k=1}^{M} B_{ik} r_k \theta(-r_k) - \mu y_i \qquad (27)$$

$\mu$ is a relaxation constant greater than 0. In formula (27), $-\mu y_i$ represents a momentum relaxation term.

The calculation apparatus 10 according to the third embodiment solves the simultaneous ordinary differential equations expressed by Formulas (26) and (27) using a discrete method. More specifically, the calculation apparatus 10 increases t by a sampling period from the start time $t_0$, and updates $x_i$ and $y_i$ by using Formulas (26) and (27) for every t. Subsequently, the calculation apparatus 10 outputs a value of $x_i$ at the end time $t_T$ with sufficiently large t, as a solution. This enables the calculation apparatus 10 to calculate a solution while updating N variables $x_i$ and N variables $y_i$ in parallel.

Figure 8:
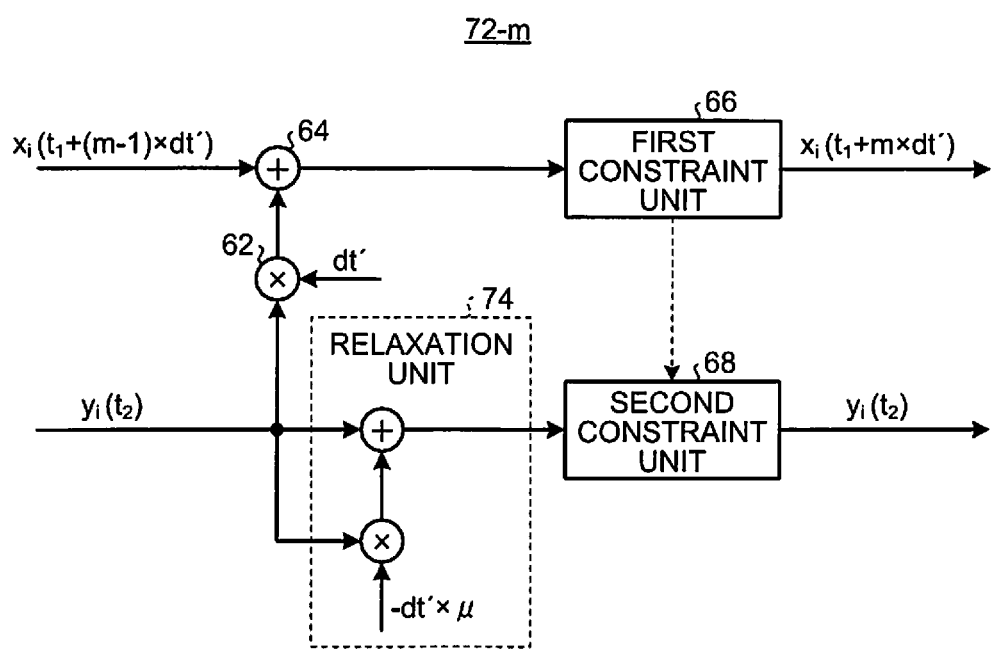
FIG. 8 is a configuration diagram of an m-th stage evolution unit according to a third embodiment.

FIG. 8 is a diagram illustrating a configuration of the m-th stage evolution unit 72-*m* according to the third embodiment. Each of the M-stage evolution units 72-1 to 72-M further includes a relaxation unit 74.

The relaxation unit 74 of the m-th stage evolution unit 72-*m* acquires N second variables $y_i(t_2)$ at the second time $t_2$ from the (m−1)-th stage evolution unit 72-(m−1). In a case where m=1, the relaxation unit 74 of the m-th stage evolution unit 72-*m* acquires N second variables $y_i(t_2)$ at the second time $t_2$ from the first addition unit 34.

The relaxation unit 74 adds a relaxation term to each of the N second variables $y_i(t_2)$ acquired at the second time $t_2$. The relaxation term is a value obtained by multiplying the second time constant dt', a value being sign-inverted value of a predetermined relaxation constant $\mu$, and a corresponding second variable $y_i(t_2)$ among acquired N second variables $y_i(t_2)$ at the second time $t_2$.

The relaxation unit 74 gives the N second variables $y_i(t_2)$ at the second time $t_2$ to which the relaxation term has been added, to the second constraint unit 68. The second constraint unit 68 executes a constraint process on the N second variables $y_i(t_2)$ at the second time $t_2$ to which the relaxation term has been added.

Figure 9:
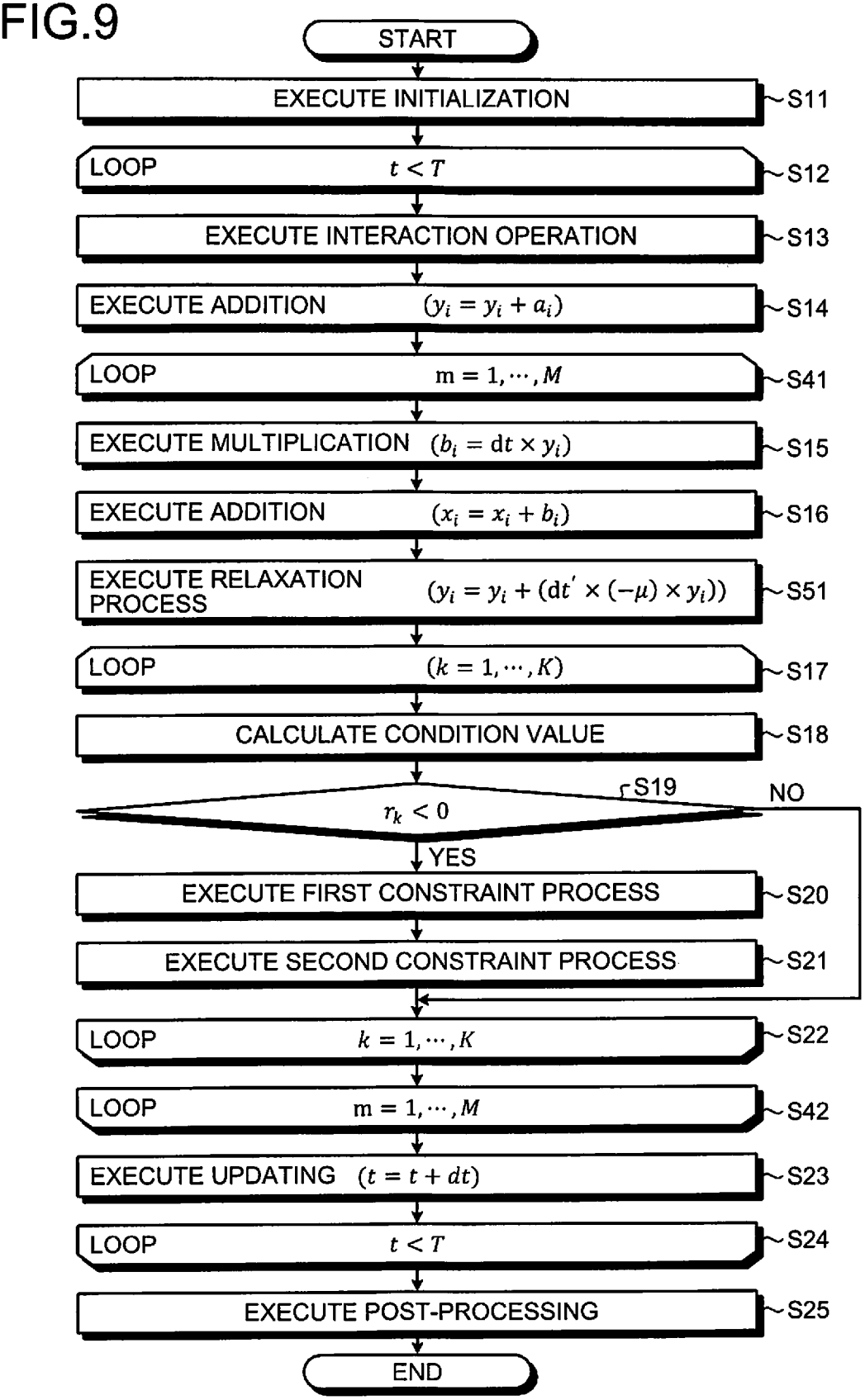
FIG. 9 is a flowchart illustrating a process flow of a computing unit according to the third embodiment.

FIG. 9 is a flowchart illustrating a process flow of the computing unit 20 according to the third embodiment. The computing unit 20 according to the third embodiment executes the process in the flow illustrated in FIG. 9. The flowchart of FIG. 9 has an additional relaxation process (S51) between S16 and S17, compared to the flowchart of FIG. 7.

The time evolution unit 36 according to the third embodiment executes a relaxation process of adding a relaxation term to each of the N second variables $y_i(t_2)$ after the process of S16. For example, in S51, the time evolution unit 36 executes computation of Formula (28) for each of i=1 to N.

$$y_i = y_i + dt' \times (-\mu) \times y_i \qquad (28)$$

Note that it is allowable to have a configuration in which the time evolution unit 36 according to the first embodiment executes the relaxation process of adding a relaxation term. In this case, the relaxation term is a value obtained by multiplying the first time constant dt, the sign-inverted value of a relaxation constant $\mu$, and a corresponding second variable $y_i(t_2)$ among acquired N second variables $y_i(t_2)$ at the second time $t_2$. That is, in this case, the time evolution unit 36 according to the first embodiment executes the process by replacing the second time constant dt' with the first time constant dt.

The calculation apparatus 10 according to the third embodiment as described above can use a simulation to solve a quadratic programming problem including constraints by K inequalities.

Fourth Embodiment

The calculation apparatus 10 according to a fourth embodiment will be described. The calculation apparatus 10 according to the fourth embodiment has substantially the same configuration as in the calculation apparatus 10 according to the third embodiment. Accordingly, blocks having substantially the same configuration are denoted by the same reference numerals, and detailed description will be omitted except for differences.

The calculation apparatus 10 according to the fourth embodiment solves simultaneous ordinary differential equations obtained by partial differentiation of the Hamiltonian H illustrated in Formula (8) with respect to each of the momentum and the position.

The equation of motion obtained by partial differentiation of the Hamiltonian H in Formula (8) is expressed by Formula (29) and Formula (30).

$$\frac{dx_i}{dt} = y_i \qquad (29)$$

$$\frac{dy_i}{dt} = -\sum_{j=1}^{N} A_{ij} x_j - \frac{\phi}{N\sqrt{M}} \sum_{k=1}^{M} B_{ik} r_k \theta(-r_k) - \mu y_i - \frac{\beta}{N} \left[ \sum_{j=1}^{N} x_j - \alpha(t) \right] - \psi x_i \theta(-x_i) \qquad (30)$$

In Formula (30), $\beta$ and $\psi$ are predetermined constants. The calculation apparatus 10 according to the fourth embodiment solves the simultaneous ordinary differential equations expressed by the equations (29) and (30) using a discrete method. More specifically, the calculation apparatus 10 increases t by a sampling period from the start time $t_0$, and updates $x_i$ and $y_i$ by using Formulas (29) and (30) for every t. Subsequently, the calculation apparatus 10 outputs a value of $x_i$ at the end time $t_T$ with sufficiently large t, as a solution. This enables the calculation apparatus 10 to calculate a solution while updating N variables $x_i$ and N variables $y_i$ in parallel.

Figure 10:
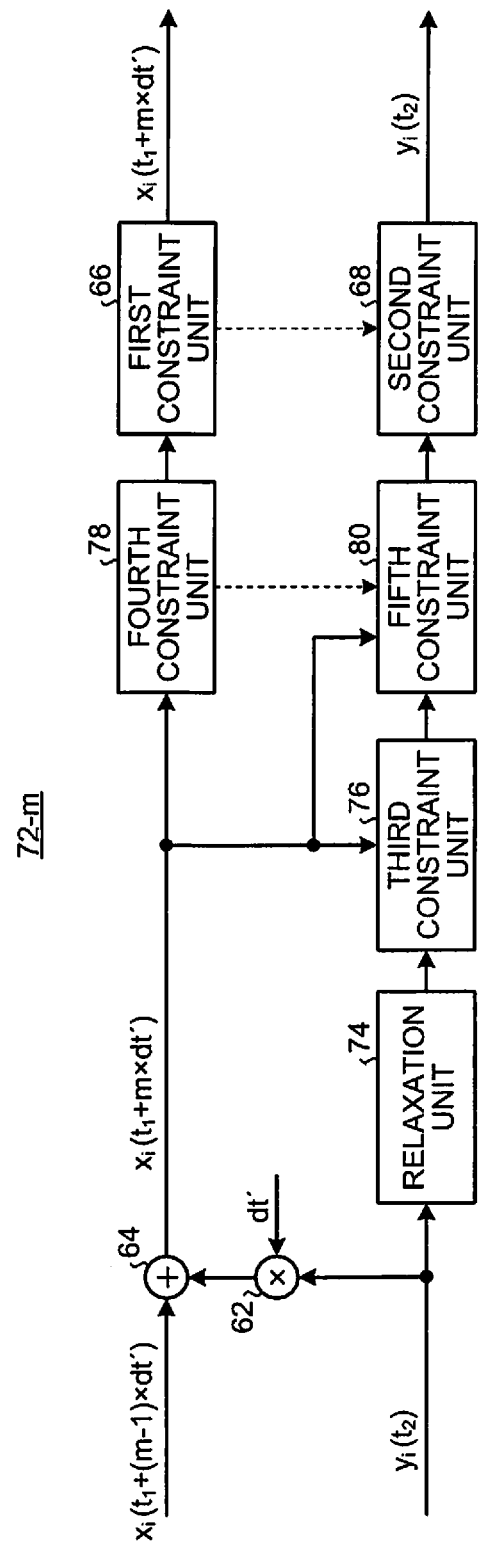
FIG. 10 is a configuration diagram of an m-th stage evolution unit according to a fourth embodiment.

FIG. 10 is a diagram illustrating a configuration of the m-th stage evolution unit 72-*m* according to the fourth embodiment. Each of the M-stage evolution units 72-1 to 72-M further includes a third constraint unit 76, a fourth constraint unit 78, and a fifth constraint unit 80.

The third constraint unit 76, the fourth constraint unit 78, and the fifth constraint unit 80 included in the m-th stage evolution unit 72-*m* operate as follows.

The third constraint unit 76 acquires N second variables $y_i(t_2)$ at the second time $t_2$ from the relaxation unit 74. The third constraint unit 76 acquires N first variables $x_i(t_1+m \times dt')$ at the m-th elapsed time $(t_1+m \times dt')$ from the second addition unit 64.

The third constraint unit 76 changes each of the acquired N second variables $y_i(t_2)$ at the second time $t_2$ in a direction in which a total value of the N first variables $x_i(t_1+m \times dt')$ at the m-th elapsed time $(t_1+m \times dt')$ becomes a predetermined standard value. In the present example, the predetermined standard value is 1. The predetermined standard value may be a value represented by $\alpha(t)$.

The fourth constraint unit 78 acquires N first variables $x_i(t_1+m \times dt')$ at the m-th elapsed time $(t_1+m \times dt')$ from the second addition unit 64. The fourth constraint unit 78 determines whether each of the N first variables $x_i(t_1+m \times dt')$ at the m-th elapsed time $(t_1+m \times dt')$ is out of (i.e. deviates from) a predetermined range. For example, the fourth constraint unit 78 determines whether each of the N first variables $x_i(t_1+m \times dt')$ at the m-th elapsed time $(t_1+m \times dt')$ is smaller than 0.

The fourth constraint unit 78 sets each of one or more N first variables $x_i(t_1+m \times dt')$ out of a predetermined range among the N first variables $x_i(t_1+m \times dt')$ at the m-th elapsed time $(t_1+m \times dt')$, to a value in a predetermined range. For example, the fourth constraint unit 78 sets each of one or more first variables $x_i(t_1+m \times dt')$ smaller than 0 among the N first variables $x_i(t_1+m \times dt')$ at the m-th elapsed time $(t_1+m \times dt')$, to 0. Note that the fourth constraint unit 78 directly outputs each of the one or more first variables $x_i(t_1+m \times dt')$ within a predetermined range among the N first variables $x_i(t_1+m \times dt')$ at the m-th elapsed time $(t_1+m \times dt')$.

The fourth constraint unit 78 gives the N first variables $x_i(t_1+m \times dt')$ at the m-th elapsed time $(t_1+m \times dt')$ to the first constraint unit 66. The first constraint unit 66 executes a constraint process on the N first variables $x_i(t_1+m \times dt')$ at the m-th elapsed time $(t_1+m \times dt')$ acquired from the fourth constraint unit 78.

The fifth constraint unit 80 acquires N second variables $y_i(t_2)$ at the second time $t_2$ from the third constraint unit 76. The fifth constraint unit 80 acquires N first variables $x_i(t_1+m \times dt')$ at the m-th elapsed time $(t_1+m \times dt')$ from the second addition unit 64.

The fifth constraint unit 80 determines whether each of the N first variables $x_i(t_1+m \times dt')$ at the m-th elapsed time $(t_1+m \times dt')$ is out of a predetermined range. Note that the fifth constraint unit 80 may determine whether each of the N first variables $x_i(t_1+m \times dt')$ at the m-th elapsed time $(t_1+m \times dt')$ is out of a predetermined range on the basis of a determination result from the fourth constraint unit 78. For example, the fifth constraint unit 80 determines whether each of the N first variables $x_i(t_1+m \times dt')$ at the m-th elapsed time $(t_1+m \times dt')$ is smaller than 0.

The fifth constraint unit 80 changes each of one or more second variables $y_i(t_2)$ corresponding to one or more first variables $x_i(t_1+m \times dt')$ out of a predetermined range among the acquired N second variables $y_i(t_2)$ at the second time $t_2$ in a direction in which the corresponding first variable $x_i(t_1+m \times dt')$ becomes within the predetermined range.

For example, the fifth constraint unit 80 changes each of one or more second variables $y_i(t_2)$ corresponding to one or more first variables $x_i(t_1+m \times dt')$ out of a predetermined range in a direction in which the corresponding first variable $x_i(t_1+m \times dt')$ becomes 0. Note that the fifth constraint unit 80 directly outputs one or more second variables $y_i(t_2)$ corresponding to the one or more first variables $x_i(t_1+m \times dt')$ within a predetermined range among the N first variables $x_i(t_1+m \times dt')$ at the m-th elapsed time $(t_1+m \times dt')$.

The fifth constraint unit 80 gives the N second variables $y_i(t_2)$ at the second time $t_2$ to the second constraint unit 68. The second constraint unit 68 executes the constraint process on the N second variables $y_i(t_2)$ at the second time $t_2$ acquired from the fifth constraint unit 80.

Figure 11:
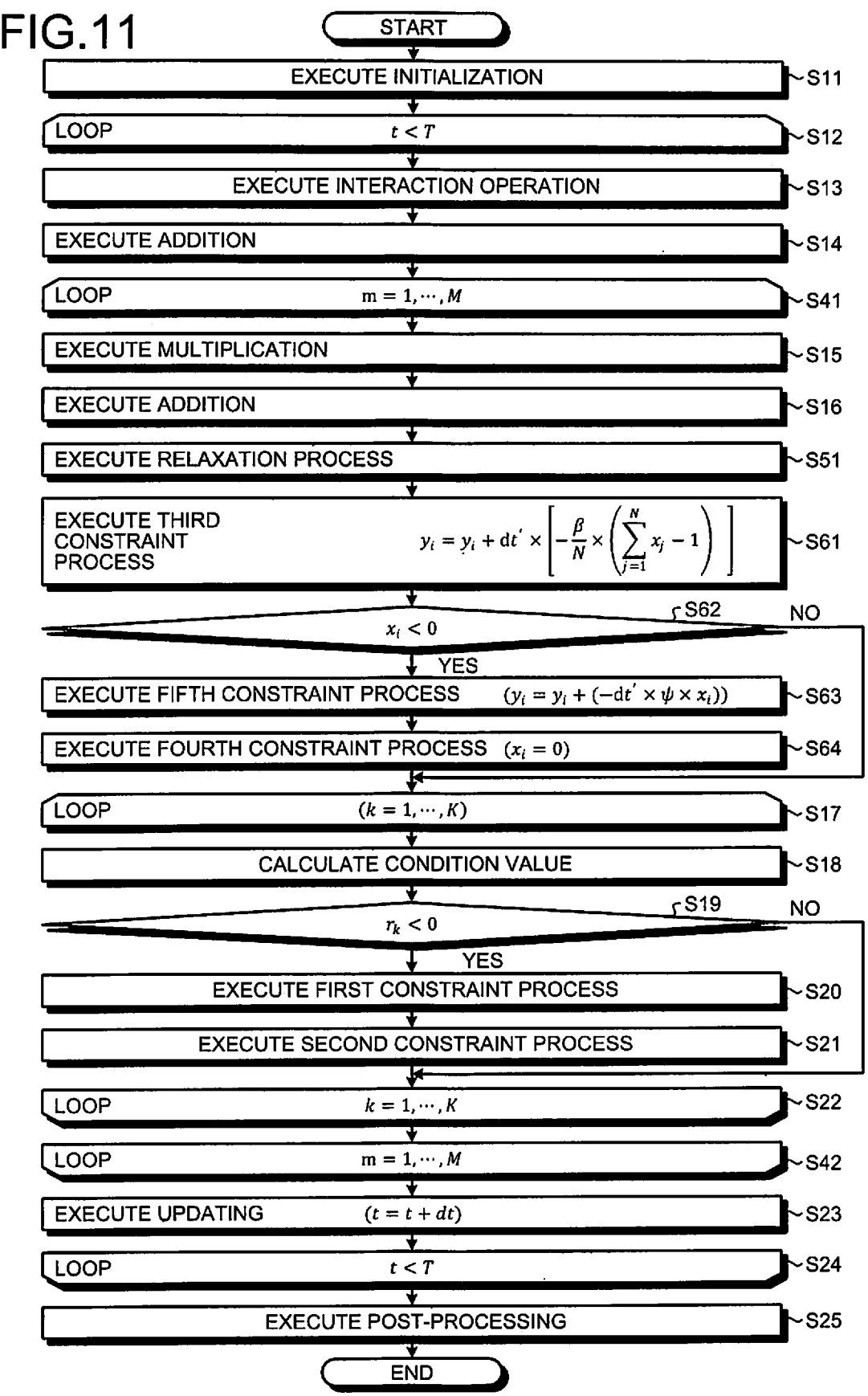
FIG. 11 is a flowchart illustrating a process flow of a computing unit according to the fourth embodiment.

FIG. 11 is a flowchart illustrating a process flow of the computing unit 20 according to the fourth embodiment. The computing unit 20 according to the fourth embodiment executes the process in the flow illustrated in FIG. 11. The flowchart of FIG. 11 has additional processes of S61 to S64 between S51 and S17, compared to the flowchart of FIG. 9. Therefore, the time evolution unit 36 according to the fourth embodiment executes the processes of S61 to S64 after the relaxation process (S51) in the M loop processes (the process between S41 and S42).

First, in S61, the time evolution unit 36 executes a third constraint process. In the third constraint process, the time evolution unit 36 changes each of the N second variables yi(t2) in a direction in which a total value of the N first variables xi becomes a predetermined standard value. In the present example, the predetermined standard value is 1. For example, in S61, the time evolution unit 36 executes computation of Formula (31) for each of i=1 to N.

$$y_i = y_i + dt' \times \left[ -\frac{\beta}{N} \times \left( \sum_{j=1}^{N} x_j - 1 \right) \right] \quad (31)$$

In Formula (31), $\beta$ is a predetermined constant.

Subsequently, in S62, the time evolution unit 36 determines whether each of the N first variables $x_i$ is smaller than 0. The time evolution unit 36 executes the processes of S63 and S64 on the first variable $x_i$ that is smaller than 0 among the N first variables $x_i$ (Yes in S62). The time evolution unit 36 moves the process to S17 without executing the processes of S63 and S64 on the first variable $x_i$ that is 0 or more among the N first variables $x_i$ (No in S62).

In S63, the time evolution unit 36 executes a fifth constraint process. In the fifth constraint process, the time evolution unit 36 executes the operation of Formula (32) on the second variable $y_i$ corresponding to the first variable $x_i$ that is smaller than 0 among the N first variables $x_i$.

$$y_i = y_i + (-dt' \times \psi \times x_i) \quad (32)$$

In Formula (32), $\psi$ is a predetermined constant. This enables the time evolution unit 36 to change the second variable $y_i$ corresponding to the first variable $x_i$ that is out of the predetermined range, in a direction in which the corresponding first variable $x_i$ becomes within a predetermined range.

In S64, the time evolution unit 36 executes a fourth constraint process. In the fourth constraint process, the time evolution unit 36 sets the first variable $x_i$ smaller than 0 among the N first variables $x_i$, to 0. This enables the time evolution unit 36 to set the first variable $x_i$ that is out of a predetermined range to a value within the predetermined range. After completing the process of S64, the time evolution unit 36 moves the process to S17.

The time evolution unit 36 according to the first embodiment may be configured to execute the third constraint process, the fourth constraint process, and the fifth constraint process. In this case, the second time constant dt' in the calculations of Formulas (31) and (32) would be replaced with the first time constant dt.

Figure 12:
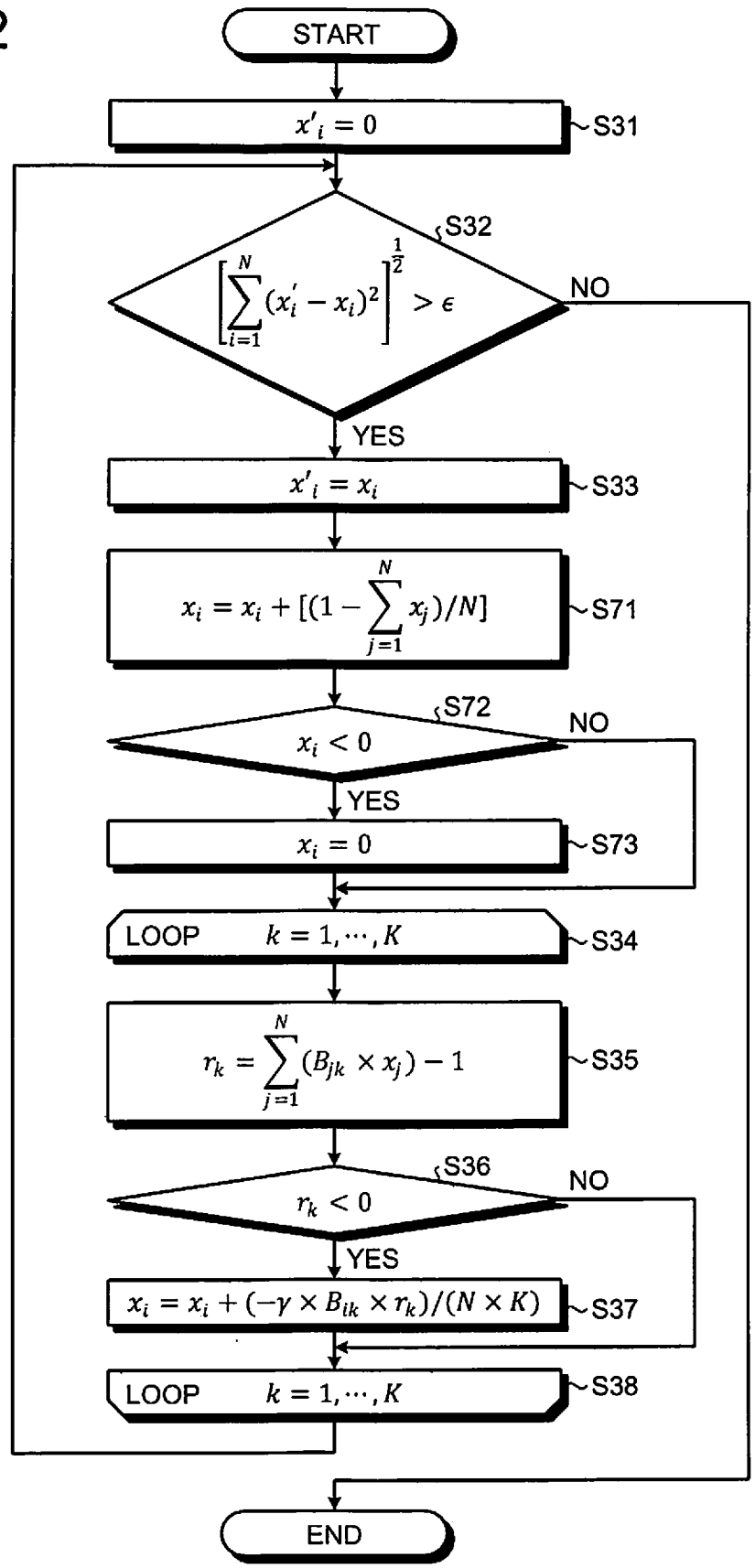
FIG. 12 is a flowchart illustrating a process flow of a post-processing unit according to the fourth embodiment.

FIG. 12 is a flowchart illustrating a process flow of the post-processing unit 42 according to the fourth embodiment.

The post-processing unit 42 according to the fourth embodiment executes the process according to the flow illustrated in FIG. 12. The flowchart of FIG. 12 has additional processes S71 to S73 between S33 and S34, compared to the flowchart of FIG. 5. Accordingly, the post-processing unit 42 according to the fourth embodiment executes the process of S71 after S33.

In S71, the post-processing unit 42 corrects each of values of the N first variables xi so that the total value of the N first variables xi will be a predetermined standard value. In the present example, the predetermined standard value is 1. For example, in S71, the post-processing unit 42 executes computation of Formula (33) for each of i=1 to N.

$$x_i = x_i + \left[\left(1 - \sum_{j=1}^{N} x_j\right)/N\right] \quad (33)$$

Subsequently, in S72, the post-processing unit 42 determines whether each of the N first variables $x_i$ is smaller than 0. The post-processing unit 42 executes the process of S73 on the first variable $x_i$ smaller than 0 among the N first variables $x_i$ (Yes in S72). The post-processing unit 42 moves the process to S34 without executing the process of S73 on the first variable $x_i$ that is 0 or more among the N first variables $x_i$ (No in S72).

In S73, the post-processing unit 42 sets the first variable $x_i$ smaller than 0 among the N first variables $x_i$, to 0. This enables the post-processing unit 42 to set the first variable $x_i$ that is out of a predetermined range to a value within the predetermined range. After completing the process of S73, the post-processing unit 42 moves the process to 534.

The calculation apparatus 10 according to the fourth embodiment as described above can use a simulation to solve a quadratic programming problem including: a constraint due to K inequalities; a constraint to set each of N variables to be within a predetermined range; and a constraint to set the total of N variables to be a predetermined standard value.

Figure 13:
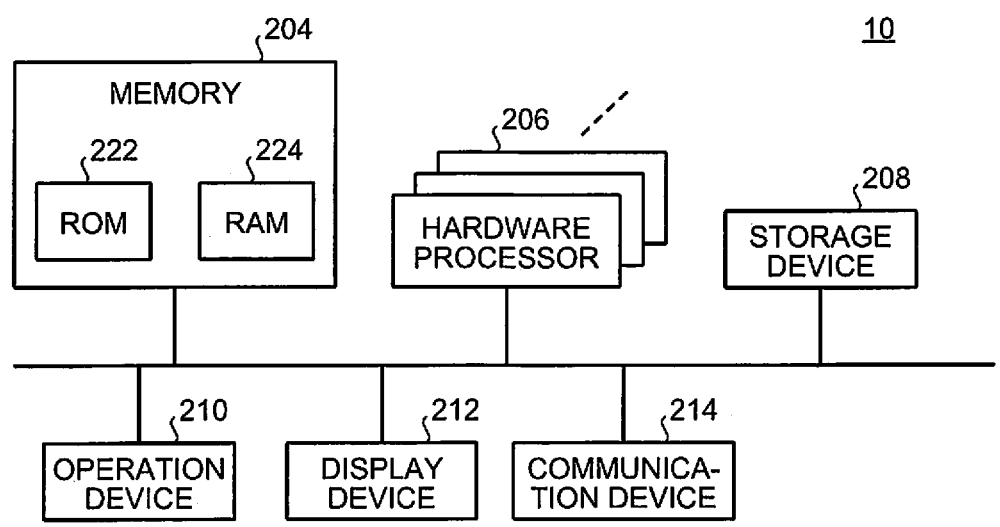
FIG. 13 is a hardware configuration diagram of a calculation apparatus.

FIG. 13 is a hardware block diagram of the calculation apparatus 10. As an example, the calculation apparatus 10 is implemented with a hardware configuration similar to the case of a general computer (information processing apparatus) as illustrated in FIG. 13. The calculation apparatus 10 may be implemented by a single computer as illustrated in FIG. 13, or may be implemented by a plurality of computers operating in cooperation. In addition, the calculation apparatus 10 may include a dedicated hardware circuit in one part.

The calculation apparatus 10 includes memory 204, one or more hardware processors 206, a storage device 208, an operation device 210, a display device 212, and a communication device 214. The individual components are connected with each other by a bus.

The memory 204 includes, for example, ROM 222 and RAM 224. The ROM 222 non-rewritably stores a program used for controlling the calculation apparatus 10, various setting information, or the like. The RAM 224 is a volatile storage medium such as synchronous dynamic random access memory (SDRAM). The RAM 224 functions as a work area for one or more hardware processors 206.

The one or more hardware processors 206 are connected to the memory 204 (ROM 222 and RAM 224) via a bus.

Each of the one or more hardware processors 206 may be a central processing unit (CPU) or an arithmetic hardware circuit, for example.

The one or more hardware processors 206 execute various processes in cooperation with various programs preliminarily stored in the ROM 222 or the storage device 208 using a predetermined area of the RAM 224 as a work area, so as to perform overall control of the operation of individual units constituting the calculation apparatus 10. In addition, the one or more hardware processors 206 control the operation device 210, the display device 212, the communication device 214, or the like, in cooperation with a program preliminarily stored in the ROM 222 or the storage device 208.

The storage device 208 is a rewritable recording device such as a semiconductor storage medium such as a flash memory or a magnetically or optically recordable storage medium. The storage device 208 stores a program used for controlling the calculation apparatus 10, various setting information, or the like.

The operation device 210 is an input device such as a mouse and a keyboard. The operation device 210 receives information operated and input from a user and outputs the received information to one or more hardware processors 206.

The display device 212 displays information to the user. The display device 212 receives information from one or more hardware processors 206 and displays the received information. In a case where information is output to the communication device 214 or the storage device 208, the calculation apparatus 10 does not have to include the display device 212. The communication device 214 communicates with an external device and transmits/receives information via a network or the like.

The program executed by the calculation apparatus 10 of the present embodiment is recorded and provided in a computer-readable recording medium such as a CD-ROM, a flexible disk (FD), a CD-R, a digital versatile disk (DVD) in a file in an installable format or an executable format.

Moreover, the program executed by the calculation apparatus 10 of the present embodiment may be stored on a computer connected to a network such as the Internet and provided by being downloaded via the network. Moreover, the program executed by the calculation apparatus 10 of the present embodiment may be provided or distributed via a network such as the Internet. Moreover, the program executed by the calculation apparatus 10 of the present embodiment may be provided by being incorporated in a ROM, or the like, in advance.

Programs that cause the information processing apparatus to function as the calculation apparatus 10 has a module configuration including: an interaction module (matrix computing module and first multiplication module); a first addition module, a time evolution module (a second multiplication module, a second addition module, a first constraint module, a second constraint module, a relaxation module, a third constraint module, a fourth constraint module and a fifth constraint module); and a post-processing module, for example. This program is executed by one or more hardware processors 206, and whereby each of modules is loaded onto the RAM 224 of the memory 204, and then, causes the one or more hardware processors 206 to function as the interaction unit 32 (the matrix operation unit 54 and the first multiplication unit 56), the first addition unit 34, the time evolution unit 36 (the second multiplication unit 62, the second addition unit 64, the first constraint unit 66, the second constraint unit 68, the relaxation unit 74, the third constraint unit 76, the fourth constraint unit 78, and the fifth constraint unit 80), and the post-processing unit 42. Note that some or all of these configurations may be configured by hardware.

Several embodiments that have been described are presented by way of example and are not intended to limit the scope thereof. These novel embodiments can be implemented in various other modes, in which various omissions, replacements, and changes can be applied without departing from the scope and spirit of the invention. These embodiments including modifications are included in the scope and spirit of the invention, and are included in the invention described in the claims and their equivalents.

Technical Proposals

The above embodiment can be summarized in the following technical proposals.

Technical Proposal 1

A calculation apparatus including:

a variable calculation unit that uses N first intermediate variables (N is an integer of 2 or more) obtained by interacting N first variables at a first time and uses N second variables at the first time and calculates the N second variables at a second time at which a sampling period elapses from the first time; and a time evolution unit that executes a time evolution process to generate the N first variables at the second time, in which the time evolution unit calculates the N first variables at the second time on the basis of the N second variables at the second time and the N first variables at the first time, and changes the N second variables at the second time in a direction of satisfying a predetermined constraint condition in a case where the N first variables at the second time do not satisfy the predetermined constraint condition.

Technical Proposal 2

The calculation apparatus according to Technical proposal 1, in which the variable calculation unit includes:

an interaction unit that multiplies each of N values calculated by performing matrix computing on the N first variables at the first time and a coefficient matrix including N×N coefficients set in advance, by a sign-inverted value of a first time constant representing the sampling period to generate N first intermediate variables; and a first addition unit that adds a corresponding first intermediate variable among the N first intermediate variables to each of the N second variables at the first time and calculates N second variable at the second time, and the time evolution unit multiplies each of the N second variables at the second time by the first time constant to calculate N second intermediate variables, and adds a corresponding second intermediate variable among the N second intermediate variables to each of the N first variables at the first time and calculates the N first variables at the second time.

Technical Proposal 3

The calculation apparatus according to Technical proposal 2, further including:

a management unit that manages processes so as to sequentially increase the time from a start time to an end time at an interval of the sampling period and so as to calculate the N first variables and the N second variables for each of times; and an output unit that outputs the N first variables at the end time.

Technical Proposal 4

The calculation apparatus according to Technical proposal 3, in which in a case where the N first variables at the second time does not satisfy the constraint condition in the time evolution process, the time evolution unit changes the N first variables at the second time in a direction of satisfying the constraint condition.

Technical Proposal 5

The calculation apparatus according to Technical proposal 4, further including a post-processing unit that, in a case where the N first variables at the end time do not satisfy the constraint condition, repeats a correction process of changing the N first variables at the end time in a direction of satisfying the constraint condition until the N first variables at the end time satisfy the constraint condition, in which the output unit outputs the N first variables at the end time after the N first variables have satisfied the constraint condition.

Technical Proposal 6

The calculation apparatus according to Technical proposal 5, in which the time evolution unit executes M (M is an integer of 1 or more) times of time evolution processes on the N second variables at the first time and generates the N first variables at the second time, and in the m-th time evolution process (m is an integer from 1 to M) among the M time evolution processes, the time evolution unit multiplies each of the N second variables at the second time by a second time constant representing a minute period of 1/M of the sampling period and calculates the N second intermediate variables, adds a corresponding second intermediate variable among the N second intermediate variables to each of the N first variables at a time at which time being (m−1) times the minute period elapses from the first time and calculates the N first variables at an m-th elapsed time at which time being m times the minute period elapses from the first time, and changes the N first variables and the N second variables at the m-th elapsed time in a direction of satisfying the constraint condition in a case where the N first variables at the m-th elapsed time do not satisfy the constraint condition.

Technical Proposal 7

The calculation apparatus according to any one of the Technical proposals 1 to 6, in which the constraint condition is expressed by one or more inequalities.

Technical Proposal 8

The calculation apparatus according to Technical proposal 7, in which in a case where an inequality is not satisfied, the time evolution unit changes the plurality of first variables and a plurality of second variables corresponding to the plurality of first variables included in the inequality in a direction in which a position represented by the plurality of first variables included in the inequality among the N first variables at the second time approaches perpendicularly to a boundary expressed by the inequality.

Technical Proposal 9

The calculation apparatus according to Technical proposal 6, in which the constraint condition is expressed by simultaneous linear inequalities including K inequalities (K is an integer of 1 or more), and each of the K inequalities includes, as a variable, a first variable being 1 or more and N or less among the N first variables.

Technical Proposal 10

The calculation apparatus according to the Technical proposal 9, in which in the m-th time evolution process, the time evolution unit changes a plurality of first variables included in the inequality among the N first variables at the second time in a direction of satisfying the inequality in a case where each of the K inequalities is not satisfied, and changes a plurality of second variables corresponding to the plurality of first variables included in the inequality in a direction of satisfying the inequality.

Technical Proposal 11

The calculation apparatus according to Technical proposal 10, in which in the m-th time evolution process, the time evolution unit adds a relaxation term to each of the N second variables at the second time, and the relaxation term is a value obtained by multiplying the second time constant, a sign-inverted value of a predetermined relaxation constant, and a corresponding second variable among the N second variables at the second time.

Technical Proposal 12

The calculation apparatus according to Technical proposal 10 or 11, in which in the m-th time evolution process, the time evolution unit changes each of the N second variables at the second time in a direction in which a total value of the N first variables at the m-th elapsed time becomes a predetermined standard value.

Technical Proposal 13

The calculation apparatus according to any one of Technical proposals 10 to 12, in which in the m-th time evolution process, the time evolution unit sets each of the one or more first variables being out of a predetermined range among the N first variables at the m-th elapsed time to be a value of the predetermined range, and changes each of the one or more second variables corresponding to the one or more first variables among the N second variables at the second time in a direction in which the corresponding first variable becomes within the predetermined range.

Technical Proposal 14

The calculation apparatus according to Technical proposal 10, in which the interaction unit executes computation of the following formula (101) from i=1 to N, $$a_i = -dt \times \sum_{j=1}^{N} A_{ij} \times x_j \qquad (101)$$

the first addition unit executes computation of the following formula (102) from i=1 to N, $$y_i = y_i + a_i \qquad (102)$$

where i and j are integers of 1 or more and N or less, $a_i$ is an i-th first intermediate variable among the N first intermediate variables, dt is the first time constant, $A_{ij}$ is an i-th row/j-th column value in the coefficient matrix, $x_j$ is a j-th first variable among the N first variables, and $y_i$ is an i-th second variable among the N second variables.

Technical Proposal 15

The calculation apparatus according to Technical proposal 14, in which the time evolution unit determines whether $r_k$ is less than 0 for each of the K inequalities, $r_k$ is a value calculated by the following Formula (103) in the determination of a k-th inequality among the K inequalities (k is an integer of 1 or more and K or less), $$r_k = \sum_{j=1}^{N} (B_{jk} \times x_j) - 1 \qquad (103)$$

where $B_{jk}$ is a coefficient for the j-th first variable in the k-th inequality.

Technical Proposal 16

The calculation apparatus according to Technical proposal 15, in which in a case where the $r_k$ is less than 0 in the determination of the k-th inequality, the time evolution unit executes the following computation in Formulas (104) and (105) from i=1 to N:

$$x_i = x_i - \frac{1}{\sum_{j=1}^{N} B_{jk}^2} \times B_{ik} \times r_k \qquad (104)$$

$$y_i = y_i + \left(-dt' \times \frac{\phi}{N\sqrt{K}} \times B_{ik} \times r_k\right) \qquad (105)$$

where $x_i$ is the i-th first variable among the N first variables, dt' is the second time constant, $\phi$ is a constant set in advance, and $B_{ik}$ is a coefficient for the i-th first variable in the k-th inequality.

Technical Proposal 17

The calculation apparatus according to Technical proposal 16, in which in the m-th time evolution process, the time evolution unit executes the following Formula (106) from i=1 to N:

$$y_i = y_i + dt' \times (-\mu) \times y_i \qquad (106)$$

where $\mu$ is a predetermined relaxation constant.

Technical Proposal 18

The calculation apparatus according to Technical proposal 16 or 17, in which in the m-th time evolution process, the time evolution unit executes the following Formula (107) from i=1 to N:

$$y_i = y_i + dt' \times \left[-\frac{\beta}{N} \times \left(\sum_{j=1}^{N} x_j - 1\right)\right] \qquad (107)$$

where $\beta$ is a predetermined constant.

Technical Proposal 19

The calculation apparatus according to any one of Technical proposals 16 to 18, in which in the m-th time evolution process, the time evolution unit executes computation of Formula (108) on a second variable corresponding to the first variable smaller than 0 among the N second variables, $$y_i = y_i + (-dt' \times \psi \times x_i) \quad (108)$$

sets the first variable smaller than 0, among the N first variables, to 0, and

ψ is a predetermined constant.

Technical Proposal 20

The calculation apparatus according to any one of Technical proposals 16 to 19, in which in the correction process, the post-processing unit executes computation of the following Formula (109) from i=1 to N, $$x_i = x_i + \left[\left(1 - \sum_{j=1}^{N} x_j\right)/N\right] \quad (109)$$

sets the first variable smaller than 0, to 0, among the N first variables, determines, for each of the K inequalities, whether $r_k$ is less than 0, and executes the following Formula (110) from i=1 to N in a case where $r_k$ is less than 0, $$x_i = x_i + (-\gamma \times B_{ik} \times r_k)/(N \times K) \quad (110)$$

where γ is a predetermined constant.

Technical Proposal 21

A calculation method used by an information processing apparatus to perform calculation, the method including:

using N first intermediate variables (N is an integer of 2 or more) obtained by interacting N first variables at a first time and using N second variables at the first time and calculating the N second variables at a second time at which a sampling period elapses from the first time, by the information processing apparatus;

executing a time evolution process and generating the N first variables at the second time by the information processing apparatus;

calculating, at the time evolution process by the information processing apparatus, the N first variables at the second time on the basis of the N second variables at the second time and the N first variables at the first time, and changing, by the information processing apparatus, the N second variables at the second time in a direction of satisfying a predetermined constraint condition in a case where the N first variables at the second time do not satisfy the predetermined constraint condition.

Technical Proposal 22

A program for causing an information processing apparatus to function as a calculation apparatus, in which the program causes the information processing apparatus to function as:

a variable calculation unit that uses N first intermediate variables (N is an integer of 2 or more) obtained by interacting N first variables at a first time and uses N second variables at the first time and calculates the N second variables at a second time at which a sampling period elapses from the first time; and a time evolution unit that executes a time evolution process to generate the N first variables at the second time, the time evolution unit calculates the N first variables at the second time on the basis of the N second variables at the second time and the N first variables at the first time, and changes the N second variables at the second time in a direction of satisfying a predetermined constraint condition in a case where the N first variables at the second time do not satisfy the predetermined constraint condition.

Technical Proposal 23

A calculation apparatus capable of setting a Hamiltonian in which time evolution is applied to the Hamiltonian H until the end time, a value of $x_i$ at the end time is acquired and output, the Hamiltonian H is expressed by the formula (111), $$H = \frac{1}{2}\sum_{i=1}^{N} y_i^2 + \frac{1}{2}\sum_{i=1}^{N}\sum_{j=1}^{N} A_{ij}x_i x_j + \sum_{k=1}^{K} \Phi\left(\sum_{i=1}^{N} B_{ik}x_i - \alpha(t)\right) \quad (111)$$

where $x_i$ and $x_j$ represent positions, $y_i$ represents momentum,

N is an integer of 2 or more, i and j are arbitrary integers of 1 or more and N or less, $A_{ij}$ represents an interaction between the i-th $x_i$ and the j-th $x_j$, $B_{ik}$ is a coefficient of i-th row/k-th column included in a constraint matrix B of N rows and K columns, t represents time, α(t) is a non-decreasing function with t as a variable, and becomes 1 at least at the end time, Φ(ξ) is a function represented by Formula (112), $$\Phi(\xi) = \frac{\phi}{2N\sqrt{K}} \xi^2 \theta(-\xi) \quad (112)$$

where ϕ is a predetermined constant, and

θ(ξ) is a function represented by Formula (113)

$$\theta(\xi) = 0 \quad (\xi \leq 0) \quad (113)$$
$$= 1 \quad (\xi > 0)$$

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A calculation apparatus comprising:
   one or more processing circuits configured to function as:
   a variable calculation unit that calculates, by using N first intermediate variables obtained by interacting N first variables at a first time and using N second variables at the first time, the N second variables at a second time at which a sampling period elapses from the first time, N being an integer of 2 or more; and
   a time evolution unit that executes a time evolution process to generate the N first variables at the second time, wherein the time evolution unit
calculates the N first variables at the second time on the basis of the N second variables at the second time and the N first variables at the first time, and
changes, if the N first variables at the second time unsatisfy a predetermined constraint condition, the N second variables at the second time in a direction of satisfying the predetermined constraint condition.

2. The calculation apparatus according to claim 1, wherein the variable calculation unit comprises:
an interaction unit that multiplies each of N values calculated by performing matrix computing on the N first variables at the first time and a coefficient matrix including N×N coefficients set in advance by a sign-inverted value of a first time constant representing the sampling period to generate N first intermediate variables; and
a first addition unit that adds a corresponding first intermediate variable among the N first intermediate variables to each of the N second variables at the first time to calculate N second variable at the second time, and
the time evolution unit
multiplies each of the N second variables at the second time by the first time constant to calculate N second intermediate variables, and
adds a corresponding second intermediate variable among the N second intermediate variables to each of the N first variables at the first time to calculate the N first variables at the second time.

3. The calculation apparatus according to claim 2, wherein
the one or more processing circuits are configured to further function as:
a management unit that manages processes so as to sequentially increase time from a start time to an end time at an interval of the sampling period and so as to calculate the N first variables and the N second variables for each of times; and
an output unit that outputs the N first variables at the end time.

4. The calculation apparatus according to claim 3, wherein, if the N first variables at the second time unsatisfy the constraint condition in the time evolution process, the time evolution unit changes the N first variables at the second time in a direction of satisfying the constraint condition.

5. The calculation apparatus according to claim 4, wherein
the one or more processing circuits are configured to further function as a post-processing unit that, if the N first variables at the end time unsatisfy the constraint condition, repeats a correction process of changing the N first variables at the end time in the direction of satisfying the constraint condition until the N first variables at the end time satisfy the constraint condition, and
the output unit outputs the N first variables at the end time after the N first variables satisfies the constraint condition.

6. The calculation apparatus according to claim 5, wherein the time evolution unit executes M time evolution processes on the N second variables at the first time to generate the N first variables at the second time, M being an integer of 1 or more, and
in the m-th time evolution process among the M time evolution processes, m being an integer from 1 to M,
the time evolution unit
multiplies each of the N second variables at the second time by a second time constant representing a minute period of 1/M of the sampling period to calculate the N second intermediate variables,
adds a corresponding second intermediate variable among the N second intermediate variables to each of the N first variables at a time at which time being m-1 times the minute period elapses from the first time to calculate the N first variables at an m-th elapsed time at which time being m times the minute period elapses from the first time, and
changes, if the N first variables at the m-th elapsed time unsatisfy the constraint condition, the N first variables and the N second variables at the m-th elapsed time in a direction of satisfying the constraint condition.

7. The calculation apparatus according to claim 6, wherein the constraint condition is expressed by simultaneous linear inequalities including K inequalities, K being an integer of 1 or more, and
each of the K inequalities includes, as a variable, a first variable being 1 or more and N or less among the N first variables.

8. The calculation apparatus according to claim 1, wherein the constraint condition is expressed by one or more inequalities.

9. The calculation apparatus according to claim 8, wherein, if an inequality is not satisfied, the time evolution unit changes the plurality of first variables and a plurality of second variables corresponding to the plurality of first variables included in the inequality in a direction in which a position represented by the plurality of first variables included in the inequality among the N first variables at the second time approaches perpendicularly to a boundary expressed by the inequality.

10. The calculation apparatus according to claim 1, wherein the time evolution unit
changes each of the N second variables at the second time in a direction in which a total value of the N first variables becomes a predetermined standard value.

11. The calculation apparatus according to claim 1, wherein the time evolution unit
sets each of the one or more first variables that deviates from a predetermined range among the N first variables to be a value of the predetermined range, and
changes each of the one or more second variables corresponding to the one or more first variables among the N second variables at the second time in a direction in which the corresponding first variable becomes within the predetermined range.

12. A calculation method implemented by an information processing apparatus to perform calculation, the method comprising:
acquiring, by an input unit of the information processing apparatus, N first variables and N second variables at a first time, N being an integer of 2 or more;
transmitting, by the input unit, the acquired N first variables and N second variables to a computing unit of the information processing apparatus;
calculating, by the computing unit of the information processing apparatus, by using N first intermediate variables obtained by interacting the N first variables at the first time and by using the N second variables at the first time, the N second variables at a second time at which a sampling period elapses from the first time;

executing, by the computing unit, a time evolution process and generating the N first variables at the second time by the information processing apparatus;

calculating, by the computing unit, at the time evolution process by the information processing apparatus, the N first variables at the second time on the basis of the N second variables at the second time and the N first variables at the first time;

changing, by the computing unit of the information processing apparatus, the N second variables at the second time in a direction of satisfying a predetermined constraint condition if the N first variables at the second time unsatisfy the predetermined constraint condition; and outputting, by an output unit, the N first variables at an end time.

13. A computer program product having a computer readable medium including instructions for causing an information processing apparatus to function as a calculation apparatus, wherein the instructions cause the information processing apparatus to function as:

a variable calculation unit that calculates, by using N first intermediate variables obtained by interacting N first variables at a first time and using N second variables at the first time, the N second variables at a second time at which a sampling period elapses from the first time, N being an integer of 2 or more; and a time evolution unit that executes a time evolution process to generate the N first variables at the second time, wherein the time evolution unit calculates the N first variables at the second time on the basis of the N second variables at the second time and the N first variables at the first time, and changes, if the N first variables at the second time unsatisfy a predetermined constraint condition, the N second variables at the second time in a direction of satisfying the predetermined constraint condition.

\* \* \* \* \*